(12) United States Patent
Endoh

(10) Patent No.: US 8,605,639 B2
(45) Date of Patent: Dec. 10, 2013

(54) BROADCAST RECEIVING APPARATUS AND DATA PROCESSING METHOD

(75) Inventor: Takashi Endoh, Yokohama (JP)

(73) Assignee: Kyocera Corporation, Kyoto (JP)

( * ) Notice: Subject to any disclaimer, the term of this patent is extended or adjusted under 35 U.S.C. 154(b) by 945 days.

(21) Appl. No.: 12/088,676

(22) PCT Filed: Sep. 26, 2006

(86) PCT No.: PCT/JP2006/319065
§ 371 (c)(1),
(2), (4) Date: Mar. 28, 2008

(87) PCT Pub. No.: WO2007/037231
PCT Pub. Date: Apr. 5, 2007

(65) Prior Publication Data
US 2011/0116431 A1 May 19, 2011

(30) Foreign Application Priority Data
Sep. 29, 2005 (JP) ................................. 2005-284273

(51) Int. Cl.
H04H 20/71 (2008.01)
(52) U.S. Cl.
USPC ........... 370/312; 725/139; 725/140; 725/141; 725/142
(58) Field of Classification Search
USPC .................. 370/312; 725/139–142
See application file for complete search history.

(56) References Cited

U.S. PATENT DOCUMENTS

| | | | | |
|---|---|---|---|---|
| 6,016,507 A * | 1/2000 | Carroll et al. | ................. | 709/217 |
| 6,286,141 B1 * | 9/2001 | Browne et al. | ................. | 725/39 |
| 6,694,022 B1 * | 2/2004 | Matsushita | ................... | 380/201 |
| 2002/0138830 A1 * | 9/2002 | Nagaoka et al. | ................. | 725/14 |
| 2004/0162022 A1 * | 8/2004 | Lahetkangas et al. | ....... | 455/41.1 |
| 2005/0229223 A1 * | 10/2005 | Katagishi et al. | ............ | 725/100 |
| 2005/0278739 A1 * | 12/2005 | Yaksick et al. | ................... | 725/41 |
| 2006/0190975 A1 * | 8/2006 | Gonzalez | ........................ | 725/88 |
| 2007/0011699 A1 * | 1/2007 | Kopra et al. | .................... | 725/22 |

FOREIGN PATENT DOCUMENTS

| | | |
|---|---|---|
| JP | 2000-031921 | 1/2000 |
| JP | 2000032413 A | 1/2000 |
| JP | 2000201117 A | 7/2000 |
| JP | 2001-357311 | 12/2001 |
| JP | 2002-044547 | 2/2002 |
| JP | 2002-077799 | 3/2002 |
| JP | 2002-184185 | 6/2002 |
| JP | 2005-079842 | 3/2005 |
| JP | 2005184185 A | 7/2005 |

OTHER PUBLICATIONS

Japanese office action dated Jul. 6, 2010 and its English translation for corresponding Japanese application 2005284273.
Japanese language office action dated Jun. 7, 2011 and its English language translation for corresponding Japanese application 2005284273.

* cited by examiner

Primary Examiner — Charles C Jiang
(74) Attorney, Agent, or Firm — DLA Piper LLP (US)

(57) ABSTRACT

To facilitate selection of broadcast data which was multiplexed on broadcast programs and was broadcast. A mobile terminal device has a digital broadcast receiving means for receiving broadcast data which was multiplexed on broadcast programs and was broadcast further has a controlling means for setting the mobile terminal device to a state so as to utilize the usable data when selecting, then instructing execution of viewing history data linked with usable data by an operating means.

9 Claims, 22 Drawing Sheets

FIG. 5A

```
┌─────────────────────────────┐ ← 51
│ 550 "PROFITABLE TV"         │
│ APRIL 15 12:00 -      [D][D]│
├─────────────────────────────┤
│ 630 "NEWS WIDE"             │
│ APRIL 15 6:50 -             │
├─────────────────────────────┤
│ 350 "WEDNESDAY DRAMA"   [R] │
│ APRIL 14 21:55 -   [D][D][D]│
├─────────────────────────────┤
│ 555 "SPECIAL REPORT"        │
│ APRIL 14 17:30 -            │
├─────────────────────────────┤
│ 635 "NEWS WEATHER"          │
│ APRIL 14 6:00 -             │
├─────────────────────────────┤
│ 230 "TIME 22"               │
│ APRIL 13 22:00 -         [D]│
├──────┬──────────┬───────────┤
│ MENU │ DETAILS  │  DELETE   │
└──────┴──────────┴───────────┘
```

FIG. 5B

Same list, with 61 indicator on the [D] in first row. Bottom buttons: MENU | SELECT | DELETE

FIG. 5C

Same list, with 61 and 55 indicators on the second [D] of the first row (highlighted). Bottom buttons: MENU | SELECT | DELETE

FIG. 5D

Same list, with 63 indicator; "630 NEWS WIDE" row highlighted; 55 indicator. Bottom buttons: MENU | DETAILS | DELETE

BROADCAST RECEIVING APPARATUS AND DATA PROCESSING METHOD

TECHNICAL FIELD

The present invention relates to a broadcast receiving apparatus provided with a digital broadcast receiving means, and to a data processing method.

In particular, the present invention relates to a broadcast receiving apparatus for detecting and storing usable data in the broadcast receiving apparatus which was multiplexed on a broadcast program and was broadcast and setting a state so as to utilize this. Further, the present invention relates to such a data utilization method.

BACKGROUND ART

Conventionally, as digital broadcasting, in satellite broadcasting, television broadcasting, radio broadcasting, data broadcasting, and other such media have been realized. Among these, as data broadcasting, data broadcasting associated with programs of television broadcasting and radio broadcasting (broadcast program associated type data broadcasting) and independent data broadcasting are being realized (refer, for example, (1) ARIB STD-B24 Data Coding and Transmission Specification for Digital Broadcasting, Association of Radio Industries and Businesses and (2) ARIB STD-B32 Video Coding, Audio Coding, and Multiplexing Specification for Digital Broadcasting, Association of Radio Industries and Businesses).

In a program associated type data broadcasting, when a program is viewed, the data broadcasting which was multiplexed on the program and broadcast can automatically be usable, so the data broadcasting enables a screen on which text and images appear to be display and enables news, weather forecasts, program related information, shopping information, and other variety of information to be acquired.

By repeatedly broadcasting the same contents during the program broadcast, a data broadcasting can be utilized without inconvenience even in a case of starting viewing after the suspensions. The digital data broadcasting creates interactive media by providing choices and making a provision of diverse information possible despite being a one-way communication medium of a "broadcast".

Further, a digital terrestrial broadcasting is also being put into commercial use, but its mechanism of multiplexing and providing programs and data broadcasting is substantially the same. Further, enabling the digital terrestrial broadcasting to be received and viewed by mobile phones is also being studied (refer, for example, Japanese Patent Publication (A) No. 2002-9920).

On the other hand, in mobile phones and other mobile terminal devices, data communication is carried out by using a mobile phone network, and the terminal device(s) is(are) connected to a data center or the Internet, then are downloaded still images, moving picture images, customized melody ring signals, and customized movie ring signals to be utilized in the terminal device(s).

Japanese Patent Publication (A) No. 2002-118683 discloses a mobile communication terminal according to this prior art. This terminal device sets a wallpaper screen, screen saver, moving picture image displayed at the time of making and receiving a call, icon, decoration of font screen frame, ring signal, incoming mail alert, and so on. A plurality of data are stored in one setting file, and upon one setting file is selected, a plurality of settings are set by the plurality of data stored in the same. The setting files may be stored in advance or acquired by download through data communication.

Further, Japanese Patent Publication (A) No. 2001-357311 discloses a data broadcasting supplying method. This is a method of assigning a data broadcast to an empty broadcast band in digital satellite broadcasting, storing the data broadcast received at a reception side in a recording medium, dividing it into each content included in the data broadcast, and appropriately selecting and viewing this recorded content by operation of a television receiver. This is intended at effective utilization of an empty narrow band and distribution of content and the spread of the service business etc.

Further, Japanese Patent Publication (A) No. 2001-333336 discloses a broadcast receiving apparatus enabling easy scheduling of recording of broadcast programs. This apparatus is an apparatus recording viewing information of viewed broadcast programs, preparing and displaying a viewing history table from recorded viewing information, selecting a broadcast program in the displayed viewing history table, and reserving the broadcast programs similar to a selected program. In this apparatus, the viewer can easily schedule recording of a series of broadcast programs which is broadcast every week or every day. The viewing history table displayed by this apparatus includes days of the week, start and end times, channels, and other information of broadcast programs which have been viewed up to the present since a certain period before.

DISCLOSURE OF THE INVENTION

Problems to be Solved by the Invention

The above examples suffer from the disadvantage that when wishing to change the wallpaper screen or ring signal to a new one, one has to connect to a data center or the Internet providing the wallpaper screen or ring signal, so the procedure for performing the data communication is troublesome.

Further, the procedure of searching for usable data and studying if it matches one's own preference is troublesome as well.

There are also quite a few mobile phone users who do not have any knowledge about data communications and do not understand the detailed method of use of the data communication, therefore it suffers from the problem that there are persons who cannot utilize such download services.

Further, there is a problem that communication fees are incurred when utilizing data communications.

The time taken for downloads differs according to the communication rate, but the communication rate of the popular types of mobile phones is 14.4 kbps to 64 kbps. Therefore, there is a problem that a time of a few minutes is required.

In the technology disclosed in Japanese Patent Publication (A) No. 2001-357311, the content included in the data broadcast is not related to the broadcast program or the content is not recorded linked with the viewed program. Therefore, there is the problem that the user cannot easily access the content related to the viewed program.

In the technology disclosed in Japanese Patent Publication (A) No. 2001-333336, the viewing history can be display, but the content is not included in the data broadcast.

Means for Solving the Problems

An object of the present invention is to overcome the above problems.

The present invention provides a broadcast receiving apparatus provided with a digital broadcast receiving means for receiving broadcast data which was multiplexed on a broadcast program and was broadcast, characterized by including a storing means for storing data usable in the broadcast receiving apparatus from among received broadcast data and a displaying means for displaying history data linking (associated with) the usable data stored in the storing means and program information corresponding to the usable data as a history list.

Effects of the Invention

According to the present invention, by viewing or recording a digital broadcast, the broadcast receiving apparatus stores the usable data. By displaying this linked (associated) with programs later and selecting it, the broadcast receiving apparatus can easily utilize the data. Further, the troublesome procedure of data communications becomes unnecessary.

These and other objects and features of the present invention will become clearer from the following description of the preferred embodiments given with reference to the accompanying drawings.

BRIEF DESCRIPTION OF THE DRAWINGS

FIGS. 5A to 5D are diagrams showing processes of changing a selected item in the viewing history list shown in FIG. 4.

DESCRIPTION OF NOTATIONS 100 to 100D . . . mobile terminal devices, 1 . . . digital terrestrial broadcasting receiving means, 2 . . . detection portion, 3 to 3D . . . storage portions, 81 . . . first protection flag storage portion, 84 . . . utilization period storage portion, 86 . . . identification data, 87 . . . copyright protection data storage portion, 4 to 4C . . . viewing history storage portions, 82 . . . second protection flag storage portion, 5 . . . display portion, 6 . . . operation portion, 601 . . . various types of keys, 602 . . . center key, 603 . . . up/down key, 7 . . . control portion, 10, 10C . . . RAM, 85 . . . delete queue, 11 . . . ROM, 12 . . . wireless portion, 13 . . . audio portion, 14 . . . microphone, 15 . . . speaker, and 83 . . . clock.

BEST MODE FOR CARRYING OUT THE INVENTION

The best mode for carrying out the present invention will be explained next with reference to the drawings by illustrating a mobile terminal device having a digital broadcast reception function as representative of the broadcast receiving apparatus of the present invention.

First Embodiment

Figure 1:
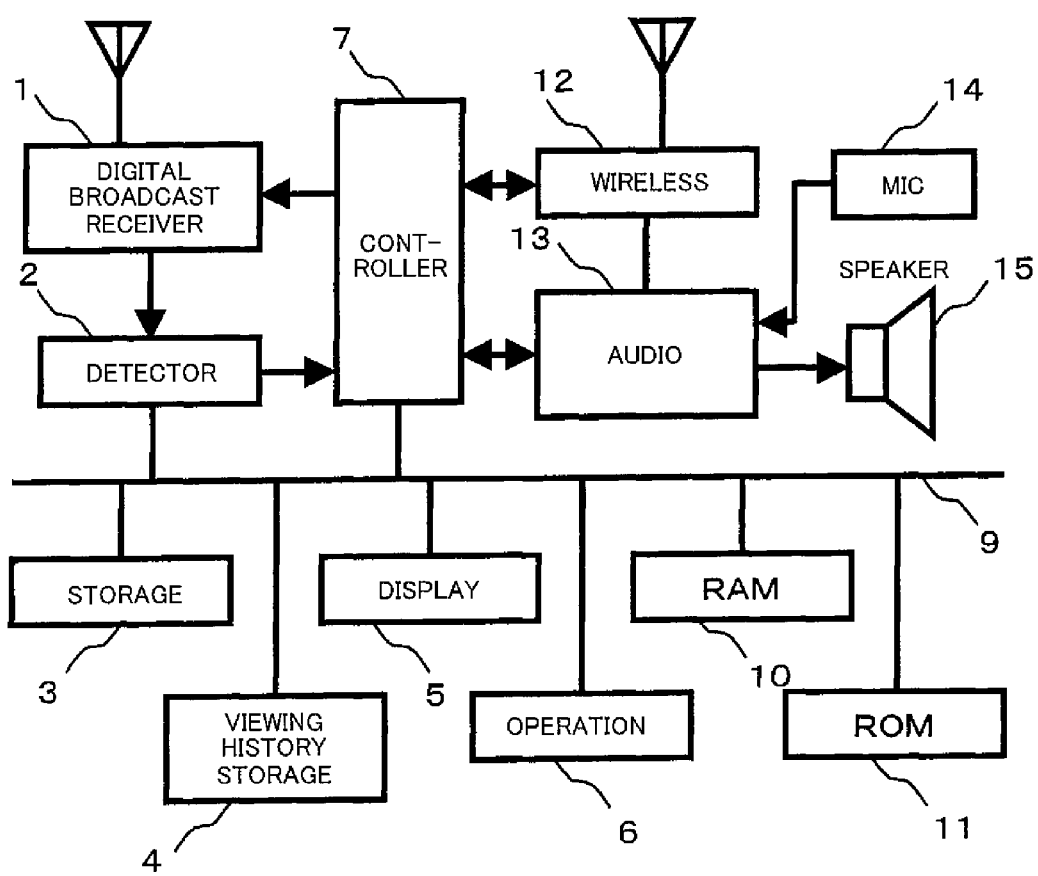
FIG. 1 is a block diagram showing the configuration of a mobile terminal device of a first embodiment of the present invention.
Figure 2:
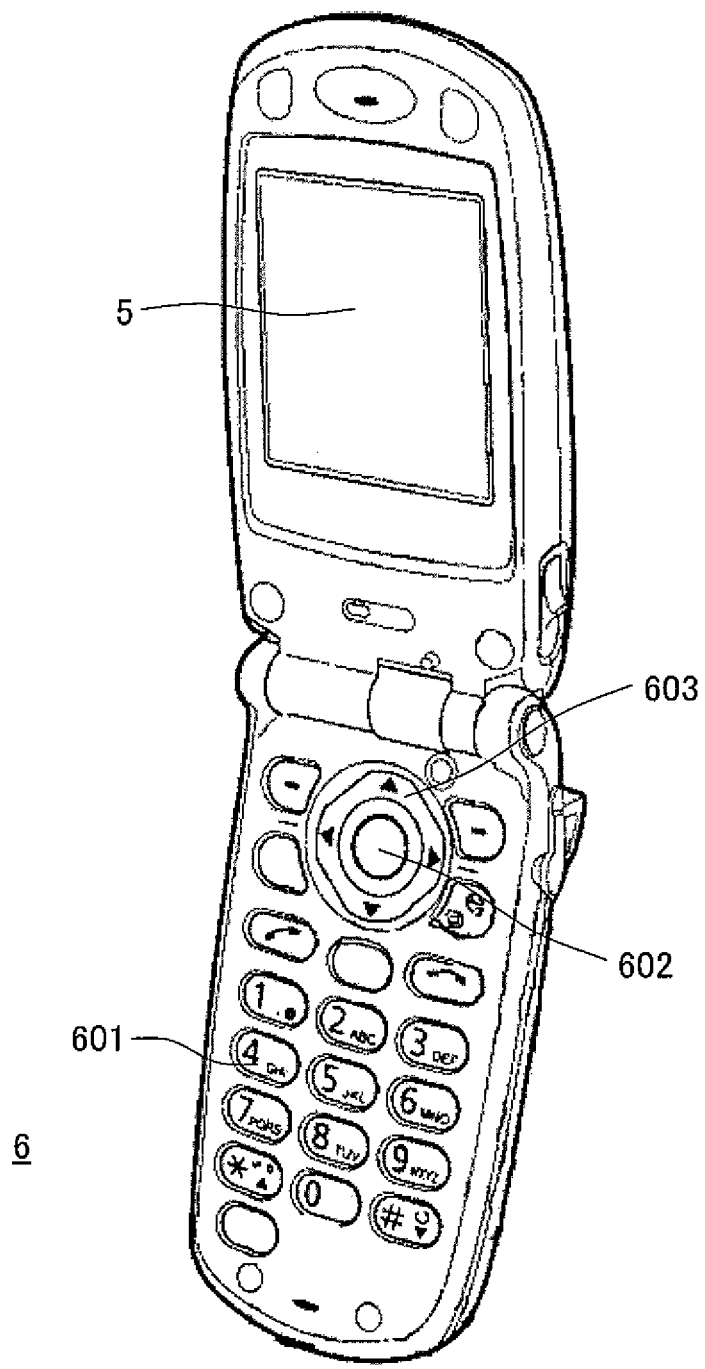
FIG. 2 is a view of the outer appearance of the mobile terminal device of FIG. 1.

FIG. 1 is a block diagram showing a mobile terminal device of a first embodiment of the present invention. FIG. 2 is a view of the outer appearance of the mobile terminal device shown in FIG. 1.

A mobile terminal device 100 in FIG. 1 and FIG. 2 is provided with a digital terrestrial broadcasting receiving means 1. Further, it is provided with a wireless portion 12 for realizing data communications utilizing a mobile phone network, an audio portion 13, a microphone (mic or mike) 14, and a speaker 15. In order to control these, there is provided a control portion 7, a bus 9, a RAM 10, and a ROM 11. By these, the mobile terminal device 100 of the present embodiment receives a digital terrestrial broadcasting and realizes the functions of a mobile phone and data communications by a single unit.

The digital broadcast receiving portion 1 receives the digital terrestrial broadcasting wave broadcast in the UHF band, demodulates 1 (one) segment of the OFDM (Orthogonal Frequency Division Multiplexing) scheme, and outputs a baseband signal directed to the mobile device. This baseband signal is data formed into packets called "transport stream (TS)". The TS packet is detected at the detection portion 2 and the required data is demultiplexed. The required packets are further demultiplexed and recomposed to various types of streams to become an audio signal and video signal (hereinafter these will be referred to all together as AV data) and data of data broadcasting.

Among these data, the AV data is supplied from the detection portion 2 to a not shown AV decoder and displayed on the display portion 5 as a broadcast program.

Further, the detection portion 2 detects the usable data multiplexed in the data broadcast and interrupts the control portion 7 to notify this. Then, the control portion 7 reads out the data from the detection portion 2 via the bus 9.

The usable data is assigned special business-defined descriptor tags. Multiplexing and demultiplexing can be carried out based on this. Further identifiers for designating a carrier of the mobile communications device, terminal maker, and model are stored. By these identifiers, the data can be distributed while limited to a special carrier and specific maker or specific model. Alternatively, by providing a "wild card" in these identifiers, data commonly usable among a broad range of terminals can be distributed as well.

The control portion 7 is for example a CPU (central processing unit) of a computer and integrates IO interface circuits and clocks in addition to the processing circuits. This forms a so-called computer system together with the bus 9, RAM 10, and ROM 11. Further, the control portion 7 controls the data broadcast receiving portion 1 and audio portion 13 by using for example an I$^2$C interface and controls the wireless portion 12 by for example an RS232C serial interface.

The control portion 7 receiving the usable data stores this via the bus 9 in the storage portion 3. The storage portion 3 is for example a nonvolatile flash memory. Alternatively, the control portion 7 may once buffer the usable data into the RAM 10, then make the storage portion 3 store this as well.

The detection portion 2 further detects the broadcast program information being received at present, notifies this to the control portion 7 by interruption, and supplies the data via the bus 9.

The "broadcast program information" means the broadcast time, broadcast channel, program name, program description, and other information.

The control portion 7 receiving the program information stores this in the viewing history storage portion 4 via the bus 9. The viewing history storage portion 4 is for example a nonvolatile flash memory as well.

The wireless portion 12 performs wireless data communications in a mobile phone network while being controlled from the control portion 7 by a serial interface. The wireless portion 12 operates as a mobile phone device as well and inputs/outputs analog audio signals together with the audio portion 13. The audio portion 13 amplifies the analog signal input from the microphone 14 and sends it to the wireless portion 12 and amplifies the reception side analog signal and makes the speaker 15 output audio. The audio portion 13 inputs/outputs the digital audio signal together with the control portion 7 by serial interface and performs A/D conversion or D/A conversion. Due to this, it is possible to reproduce music data and output it from the speaker 15 or pick up sound from the microphone 14 and store digital audio data in the RAM 10.

Figure 3:
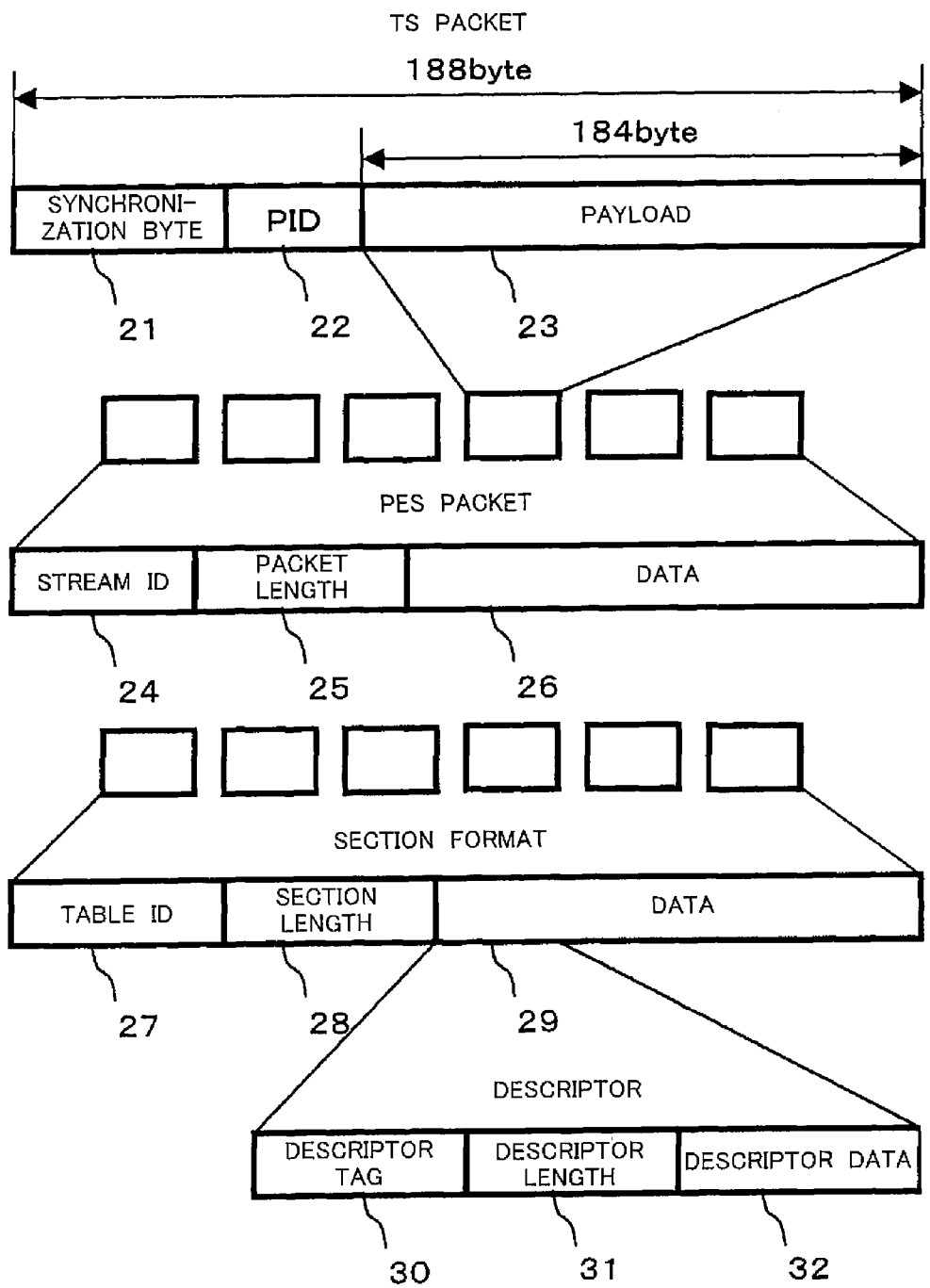
FIG. 3 is a diagram for schematically explaining a multiplexing specification in a digital broadcasting.

FIG. 3 is a diagram for schematically explaining the multiplexing method in the digital broadcasting. The transmitted data is a group of transport stream (TS) packets. A TS packet has 188 bytes, among which a header has 4 bytes, and a payload 23 other than the header has 184 bytes. The header includes a synchronization byte 21 and a packet identifier (PID) 22. When the digital broadcast receiving portion 1 receives TS packets, they are classified based on the PIDs 22 to assemble a packetized elementary stream (PES) or a section format.

The PES stores video, audio, and other data, and the section format stores file and other data.

The PES includes a stream ID 24, packet length 25, data 26, etc. The PES is divided into 184 byte sections which are stored in the payload 23.

The section format includes a table id 27, section length 28, data 29, etc. This is similar separated (divided) into 184 byte sections of data which are stored in the payload 23.

The data 29 of the section format further has a descriptor. The descriptor includes a descriptor tag 30, a descriptor length 31, and a descriptor data 32.

For example, in order to transmit a general use event message to an application of the receiver by a broadcasting station, this is broadcast multiplexed by a section format setting the descriptor tag 30 to "0x40" and setting the table id 27 to "0x3D". This section format is an extension of the DSM-CC (Digital Storage Media Command and Control) carousel transmission method. Note that the PID of the DSM-CC is designated in the PMT (Program Map Table), so is learned when receiving the PMT.

The data usable in the mobile terminal device 100 of the present embodiment is assigned, in the section format, a descriptor tag 30 from a range of values selectable as the values to a descriptor defined by a broadcaster.

The detection portion 2 detects this descriptor tag 30 to recognize the presence of usable data.

The broadcast program information is stored with the table id 27 of 0x4E in the EIT (Event Information Table). The detection portion 2 detects this as well. From the EIT, name of the program presently being received, a program description, start time, time length, etc. can be acquired.

After that, the user operates the various keys 601, 602, and 603 of the operation portion 6 shown in FIG. 1 and FIG. 2 to make the display portion 5 display the viewing history list.

Figure 4:
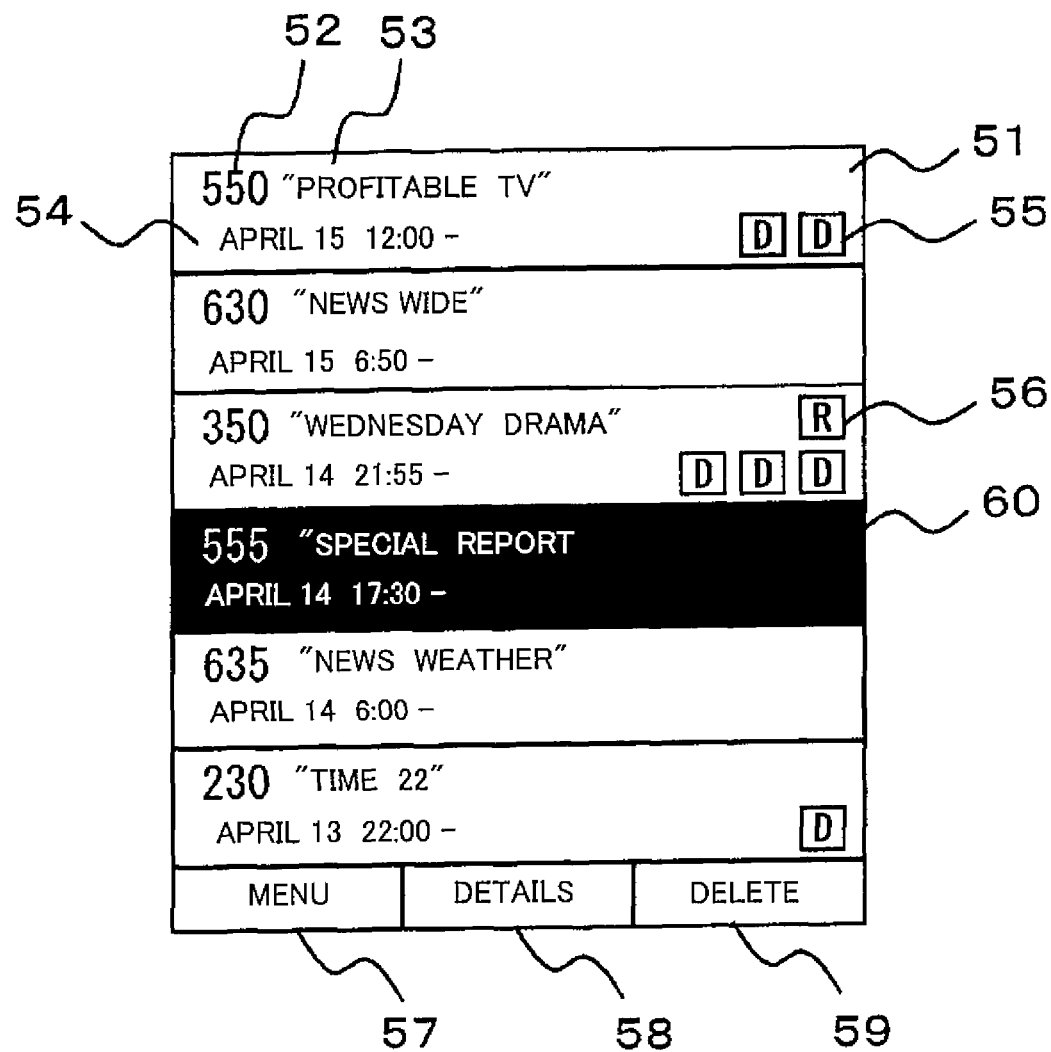
FIG. 4 is a diagram showing an example of a viewing history list displayed on a display portion of the mobile terminal device.

FIG. 4 is a diagram showing an example of the viewing history list displayed on the display portion 5. One viewing history data display 51 is displayed in two rows, and a plurality of viewing history data are displayed in the form of a list. At the last level, an area 57 showing the processing of a left soft key located in the operation portion 6, an area 58 showing the processing content of a center key 602, and an area 59 showing the processing content of a right soft key are displayed. The processing content when these keys are depressed changes according to each state. The text displayed in the areas 57 to 59 change as well in accordance with that.

In the viewing history data display 51, the channel number 52, program name 53, and start time 54 are displayed. Further, in the viewing history data display 51, small images 55 are displayed. These shows the presence of usable data. Two small images are displayed, therefore it is shown that two usable data are acquired during the viewing of this program. A small image 56 shows the presence of the recorded data. It is shown that a recording operation was carried out during the program viewing etc.

In the viewing history list, there is only one item which has a focus. The focused state and non-focused state are differentiated by changing colors. However, in the example shown in FIG. 4, this is shown by inversion such as with the viewing history data display 60.

FIG. 5A to FIG. 5D are diagrams showing processes of changing a focused item in the viewing history list shown in FIG. 4.

In FIG. 5A, the viewing history data display 51 of the uppermost level is focused and inversely displayed. Here, if depressing the down key at the operation portion 6, a small image 61 gains the focus and inversely displayed as shown in FIG. 5B. If the down key is further depressed, a small image 55 gains the focus and inversely displayed as shown in FIG. 5C. If the down key is further depressed, a viewing history data display 63 gains the focus and inversely displayed as shown in FIG. 5D.

If the user (operator) depresses the center key 602 shown in FIG. 2 in a state where the small image 55 or small image 61 showing the presence of usable data which was broadcast corresponding to the program is focused and inversely displayed, the mobile terminal device 100 is set to a state so that the corresponding usable data is utilized. However, naturally a dialog for confirming from the user whether this state should be set may be displayed as well. The usable data which was broadcast corresponding to the program includes a ring signal and various types of still images and moving picture images. When the device is set to a state so that they can be utilized, they begin to be displayed and played in a variety of scenes of the mobile terminal device 100.

The usable data which was broadcast corresponding to a broadcast program may be an image relating to the program, that is, an image including the program name or a photo of performer. The ring signal may be made music data used in the program. Further, the usable data provided by a sponsor of the program may be image or music data produced and written by each as well. It becomes possible to enjoy the fun of renovating the mobile terminal device of the user and, at the same time, display product information and service information. Further, it is also possible to distribute high grade music data in an encrypted state and collect a fee when the user reproduces and listens to that music.

Figure 6:
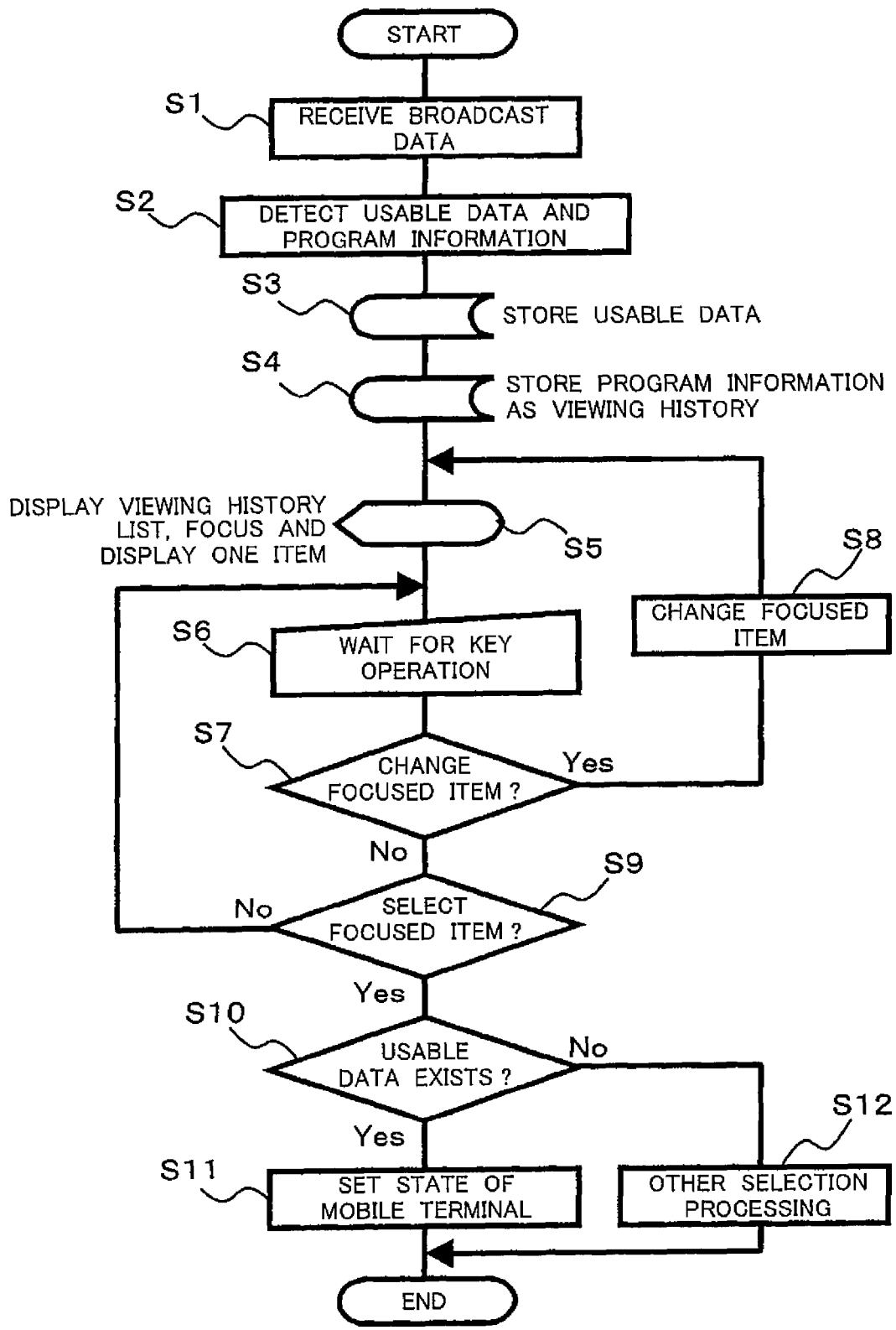
FIG. 6 is a flow chart showing a data processing method of a mobile terminal device according to an embodiment of the present invention.

FIG. 6 is a flow chart showing the data processing method of the mobile terminal device 100 according to an embodiment of the present invention. FIG. 6 is also a diagram showing a processing sequence (steps) of the mobile terminal device 100 of the embodiment of the present invention shown in FIG. 1. In FIG. 6, when the mobile terminal device 100 starts the processing, the digital broadcast receiving portion 1 executes the processing step S1.

The processing step S1 is processing for receiving digital broadcast data which was multiplexed in a program and was broadcast. This processing is continuously carried out at the digital broadcast receiving portion 1. Next, the routine proceeds to the processing step S2.

The processing step S2 is processing for detecting the data usable in the mobile terminal device 100 and the program information of the program from among the received digital broadcast data. Each data is supplied together with the table id 27 and descriptor tag 30 allocated to each, and each data is detected by these. Next, the routine proceeds to the processing step S3.

The processing step S3 is processing for storing the usable data in the storage portion 3 under the control of the control portion 7. Next, the routine proceeds to the processing step S4.

The processing step S4 is processing for storing the program information as the viewing history data linked (associated) with the usable data. Next, the routine proceeds to the processing step S5.

The processing step S5 is processing of the control portion 7 for preparing and displaying the viewing history list from the viewing history data stored in the storage portion 3 and selecting and displaying one item from among a displayed plurality of items. In the viewing history data display 51 displayed in the viewing history list, the channel 52, the program name 53, and the broadcast start time 54 are displayed. Further, when there is usable data linked, a small image 55 showing that is displayed. When a plurality of usable data are stored in the storage portion 3 during one program, a plurality of small images are displayed. Only one selected item exists in the viewing history list and is displayed by changing its color from the others. Each image showing the presence of usable data is made to be able to gain a focus as the selectable item. Next, the routine proceeds to the processing step S6.

The processing step S6 is processing for waiting for a key event. A "key event" occurs by the user depressing one of the various keys 601, 602, and 603 of the operation portion 6. Next, the routine proceeds to a judgment processing step S7.

The judgment processing step S7 is processing for the control portion 7 judging if the occurring key event indicates a change of the focused and displayed item. Data notifying a key event includes information of which key in the operation portion 6 was focused, released, or continuously depressed. The selected item is shifted by the up/down key 603 (FIG. 2) of the mobile terminal device 100. Therefore, the control portion 7 judges that the change of item is instructed in a case where the up/down key 603 is depressed and a case where it is continuously depressed. In a case where the result of the judgment processing in the control portion 7 is that the occurring key event instructs a change of the focused and displayed item, the routine proceeds to the processing step S8. When it is not instructed, the routine proceeds to the judgment processing step S9.

The processing step S8 is processing for changing the focused item. In a case where the down key of the up/down key 603 is depressed or continuously depressed, the focused item is shifted to one in a rightward direction. In a case where there is no item to be focused in the rightward direction, the focused item is shifted to one in a downward direction. In a case where the up key of the up/down key 603 is depressed or continuously depressed, the control portion 7 shifts the focused item to one in a leftward direction. In a case where there is no item to be focused in the leftward direction, the control portion 7 shifts the focused item to one in an upward direction. Next, the routine proceeds to the processing step S5.

The judgment processing step S9 performed in the control portion 7 is processing for judging if the occurring key event instruct selection of the focused and displayed item. The focused item is selected by the center key 602. When the center key 602 is depressed, then the center key 602 is released, it is judged that the selection of the focused item is instructed. In a case where the result of the judgment processing in the control portion 7 is that the occurring key event instructs the selection of the focused and displayed item, the routine proceeds to the judgment processing step S10. When selection is not instructed, the routine returns to the processing step S6.

The judgment processing step S10 in the control portion 7 is processing for judging if usable data exists linked (associated) with the viewing history data to which the item for which selection is instructed belongs. The item for which selection is instructed is the item which is focused at present. Therefore, which viewing history data includes the focused item at present is managed. Accordingly, it is judged whether or not a pointer to the viewing history data related to that viewing history is NULL (0, none). When the pointer is not NULL, valid usable data exists, therefore the routine proceeds to the processing step S11. When the pointer is NULL, linked usable data does not exist, therefore the routine proceeds to the processing step S12.

The processing step S11 is processing for the control portion 7 setting the mobile terminal device 100 to a state so that the usable data is utilized. The usable data is comprised of a wallpaper image, ring signal, decorative image of a frame, and other single contents and a definition file describing the presence and types of those. As the descriptive language of this definition file, use is made of for example XML. The mobile terminal device 100 of the present embodiment is sets in state so as to utilize each single content based on this XML definition file. That is, the mobile terminal device 100 of the present embodiment recognizes that the wallpaper described in the XML definition file must be utilized when the user is going to display the wallpaper screen, extracts the corresponding wallpaper from the storage portion 3, and performs the display processing. After processing step S11, this sequence ends. Accordingly, display processing and reproduction processing using the usable data and other various types of processing are executed.

The processing step S12 in the control portion 7 is another selection processing concerning the focused item. For example, it is processing for displaying detailed information of the focused item and processing for jumping pages in order to display the related information. After the processing step S12, the processing of this flow chart ends.

According to the mobile terminal device of the first embodiment of the present invention and the data processing method of that mobile terminal device, the device can be set to a state so that, by viewing the digital broadcast, the data usable in the mobile terminal device 100 is stored in the storage portion 3, and the usable data is utilized in the mobile terminal device 100 by selecting this later. Therefore, troublesome procedures such as data communications become unnecessary.

Further, good quality data can be stored one after another without having to search for usable data or choosing favorites.

In the first embodiment of the present invention, the digital broadcast is utilized, therefore there is the advantage that no communications fee is generated. Further, the usable data is stored during viewing of the program, therefore there is the advantage that no time is consumed for downloading.

Further, the presence of the usable data stored in the storage portion 3 is displayed on the display portion 5 when displaying the viewing history in a list. Therefore, there is the advantage that the data related to the program and the sponsor of the program can be easily called and selected.

Second Embodiment

Figure 7:
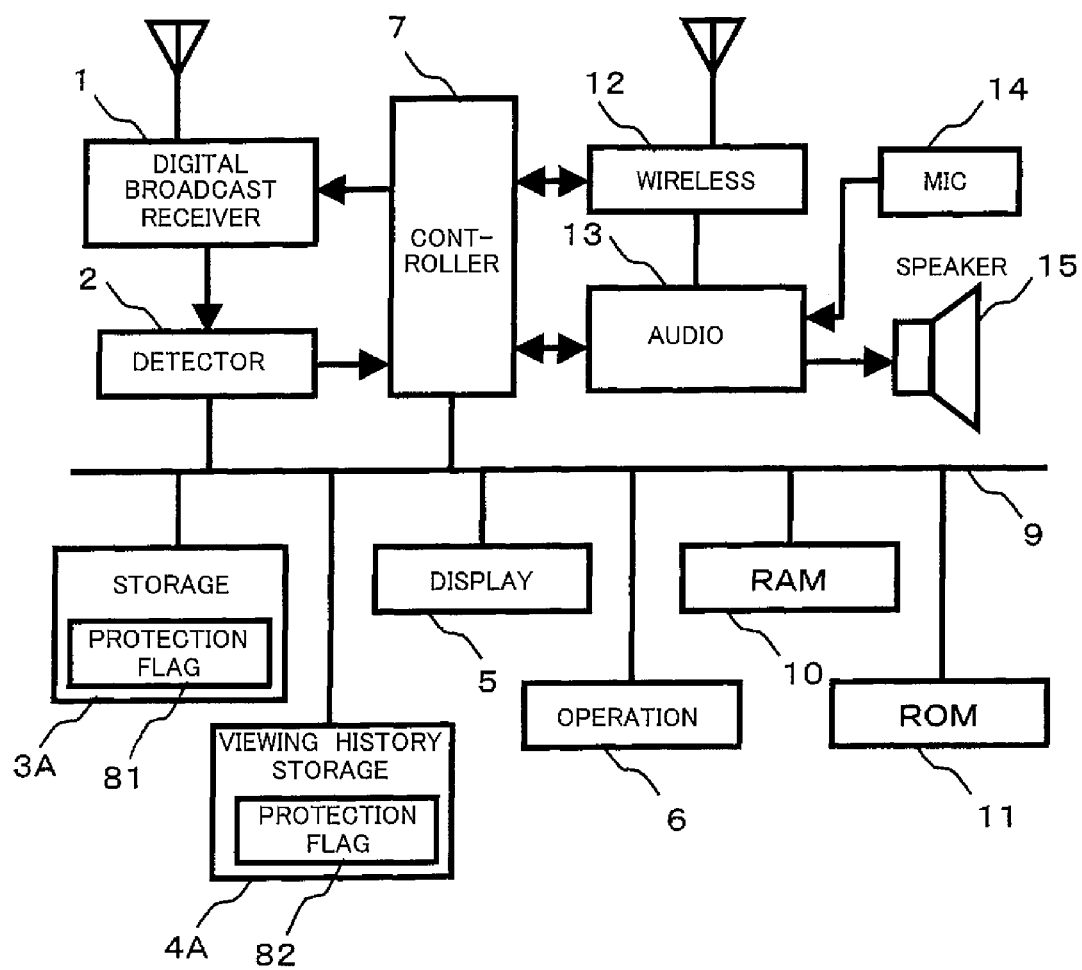
FIG. 7 is a block diagram showing the configuration of a mobile terminal device of a second embodiment of the present invention.

FIG. 7 is a block diagram showing the configuration of a mobile terminal device 100A of a second embodiment of the present invention.

The mobile terminal device 100A shown in FIG. 7 is basically similar to the configuration of the mobile terminal device 100 shown in FIG. 1, but is further provided with a first protection flag storage portion 81 for storing a usable data protection flag in the storage portion 3A and a second protection flag storage portion 82 for storing a viewing history protection flag in a viewing history storage portion 4A.

In the mobile terminal device 100A of the second embodiment, when making the storage portion 3A store the received usable data, the first protection flag storage portion 81 is made to store a usable data protection flag linked with this. At this time, this is not protected. Therefore, in order to protect the usable data, the user operates the operation portion 6 and the control portion 7 separately sets the protection in response to that.

Further, when making the viewing history storage portion 4A store the received program information as the viewing history data, the second protection flag storage portion 82 is made to store a viewing history protection flag linked with this. At this time, this is not protected. Therefore, in order to protect the viewing history data, the user operates the operation portion 6 and the control portion 7 separately sets the protection in response to that.

In the second embodiment, the method of protection may be one for use of either of the usable data protection flag or viewing history protection flag or one for simultaneous use of the two.

In the second embodiment, when there is no empty region for storing new usable data in the storage portion 3A, the control portion 7 examines the usable data stored in the storage portion 3A, refers to the usable data protection flags stored in the first protection flag storage portion 81 linked with the usable data stored in the storage portion, and searches for usable data which is not protected. When usable data for which protection is not set is found, it is deleted, and the new usable data is stored in a storage region thereof. Due to this, even when the storage capacity of the storage portion 3A is limited, successive storage of the newest usable data is enabled and, in addition usable data which must not be overwritten can be protected.

Further, in the second embodiment, when there is no empty region for storing the new viewing history data in the viewing history storage portion 4A, the control portion 7 examines the viewing history data stored in the viewing history storage portion 4A, refers to the viewing history data protection flags stored in the second protection flag storage portion 82 linked with the viewing history data stored in the viewing history storage portion, and searches for viewing history data for which protection is not set and which is linked with the viewing history data. When such viewing history data is found, the control portion 7 deletes the viewing history data linked with that and makes the storage portion 3A store the new usable data in the storage region thereof. Due to this, even when the storage capacity of the storage portion 3A is limited, successive storage of the newest usable data is enabled and, in addition, usable data which must not be overwritten can be protected.

Figure 8A:
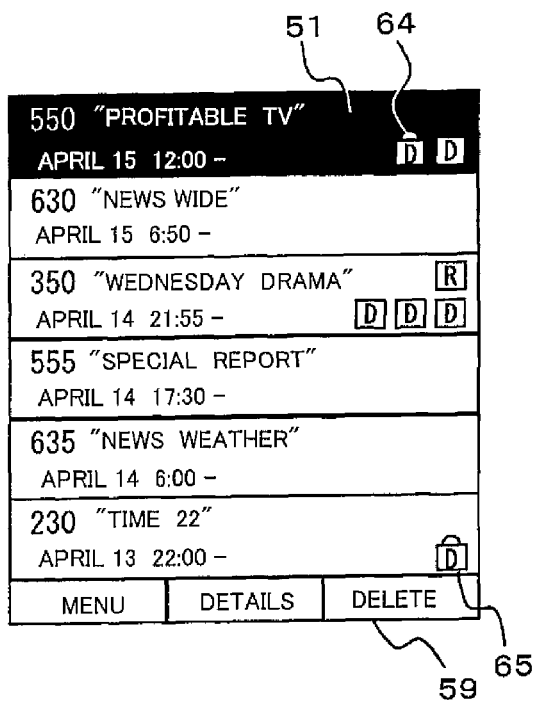
FIGS. 8A to 8B are diagrams showing examples of the viewing history list displayed on the display portion when the usable data is protected in the second embodiment of the present invention.
Figure 8B:
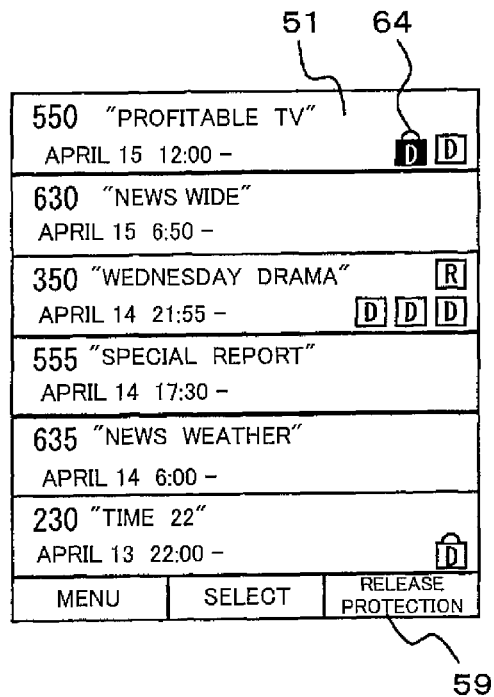

FIG. 8A and FIG. 8B are diagrams showing an example of the viewing history list displayed on the display portion 5 when the usable data is protected in the second embodiment.

The small images showing the presence of the protected usable data are the small image 64 and small image 65 and are changed to images that mean locking. In FIG. 8A, the viewing history data display 51 is in the focused state and inversely displayed. If the down key of the up/down key 603 is depressed in this state, the focused item shifts to the small image 64 which is then inversely displayed as shown in FIG. 8B. The protected usable data cannot be deleted unless the protection is released, therefore the menu display 59 of the right soft key is replaced by "RELEASE PROTECTION".

Figure 9:
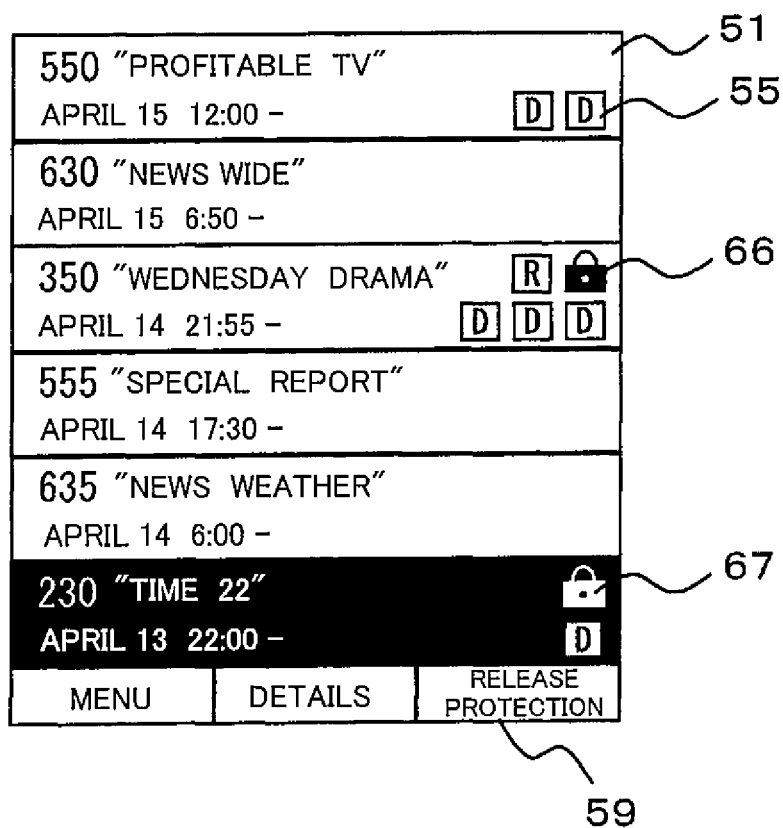
FIG. 9 is a diagram showing an example of the viewing history list displayed on the display portion 5 when the viewing history data is protected in the second embodiment.

FIG. 9 is a diagram showing an example of the viewing history list displayed on the display portion 5 when the viewing history data is protected in the second embodiment.

In the protected viewing history data display, the small image 66 and small image 67 showing images of locks are displayed. When the focused viewing history data is protected, the inversely displayed small image 67 is displayed and the menu display 59 of the right soft key is replaced by "RELEASE PROTECTION".

Figure 10:
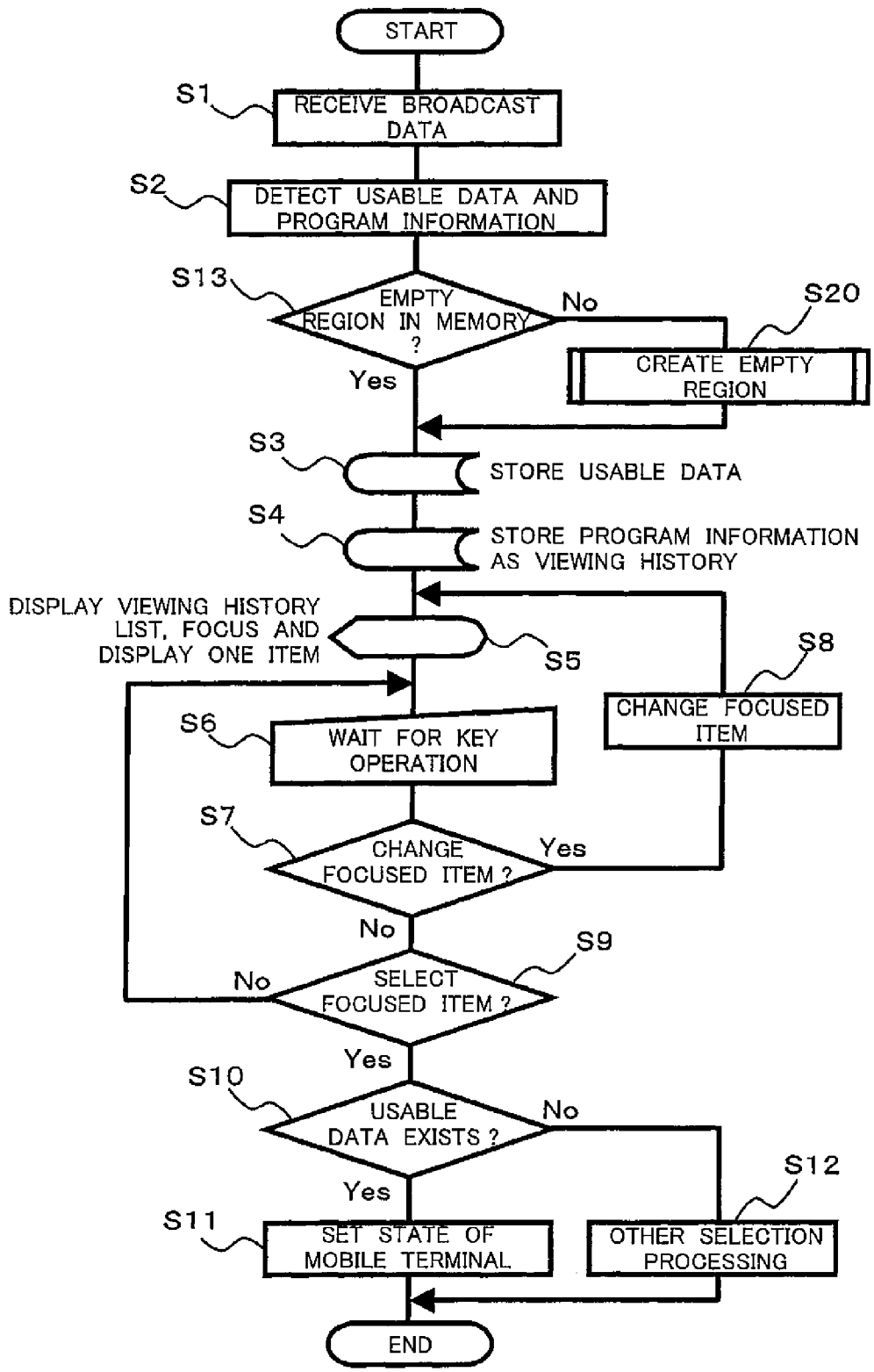
FIG. 10 is a flow chart showing an embodiment of a data utilization method of the mobile terminal device of the second embodiment of the present invention.

FIG. 10 is a flow chart showing an embodiment of the data utilization method of the mobile terminal device 100A of the second embodiment of the present invention. FIG. 10 shows the processing sequence (steps) of the mobile terminal device 100A of the second embodiment of the present invention shown in FIG. 7.

The flow chart of FIG. 10 is similar to the processing of the flow chart shown in FIG. 6. The difference resides in the contents of the processing step S13 and the processing step S20. Namely, in the mobile terminal device 100A of the second embodiment, the control portion 7 checks at the processing step S13 whether or not there is an empty region of the storage capacity in the storage portion 3A. When there is no empty region, the control portion 7 forms an empty region in the processing step S20.

Figure 11:
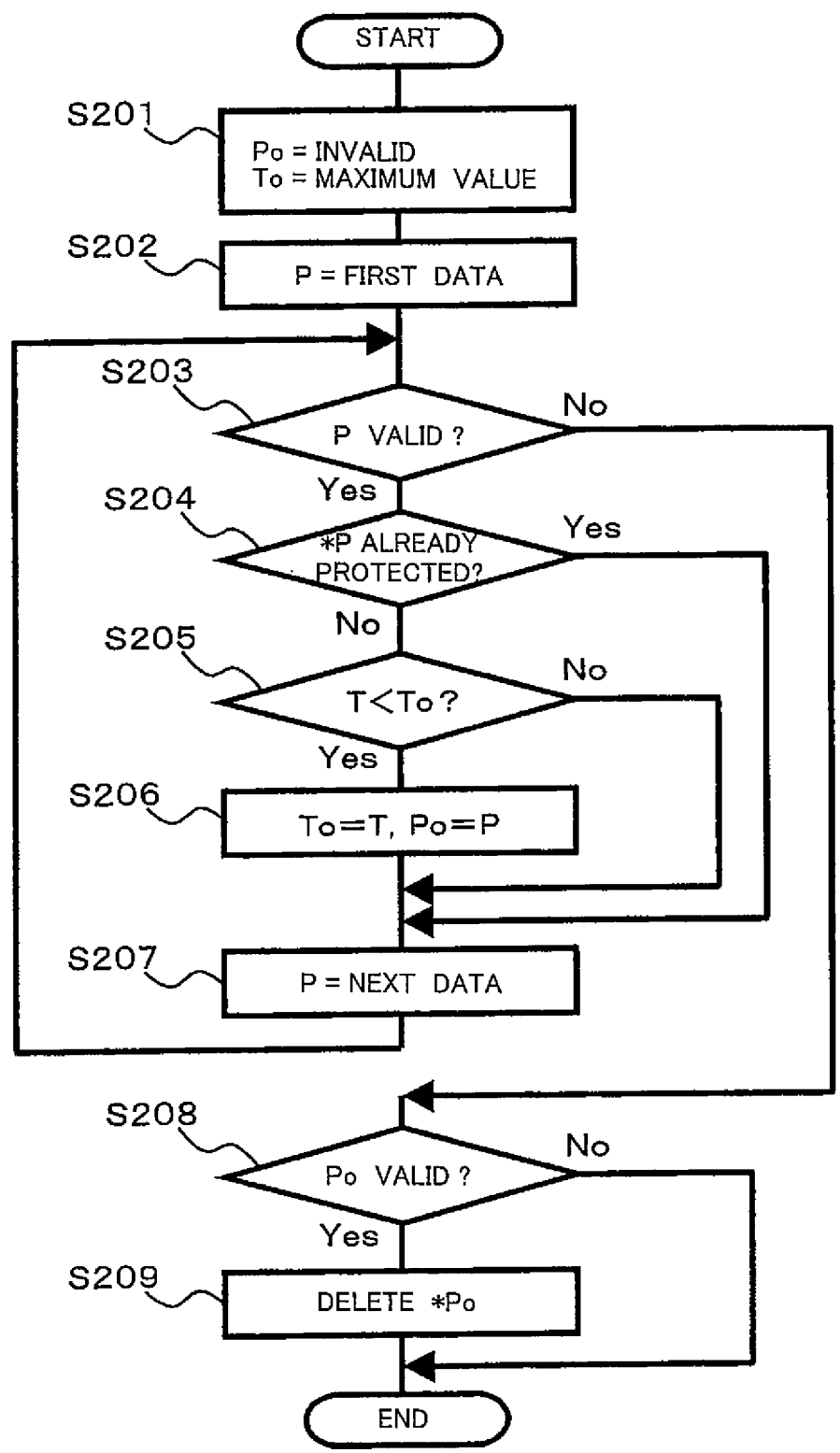
FIG. 11 is a flow chart showing details of a first method of a processing step S20 in FIG. 10.
Figure 12:
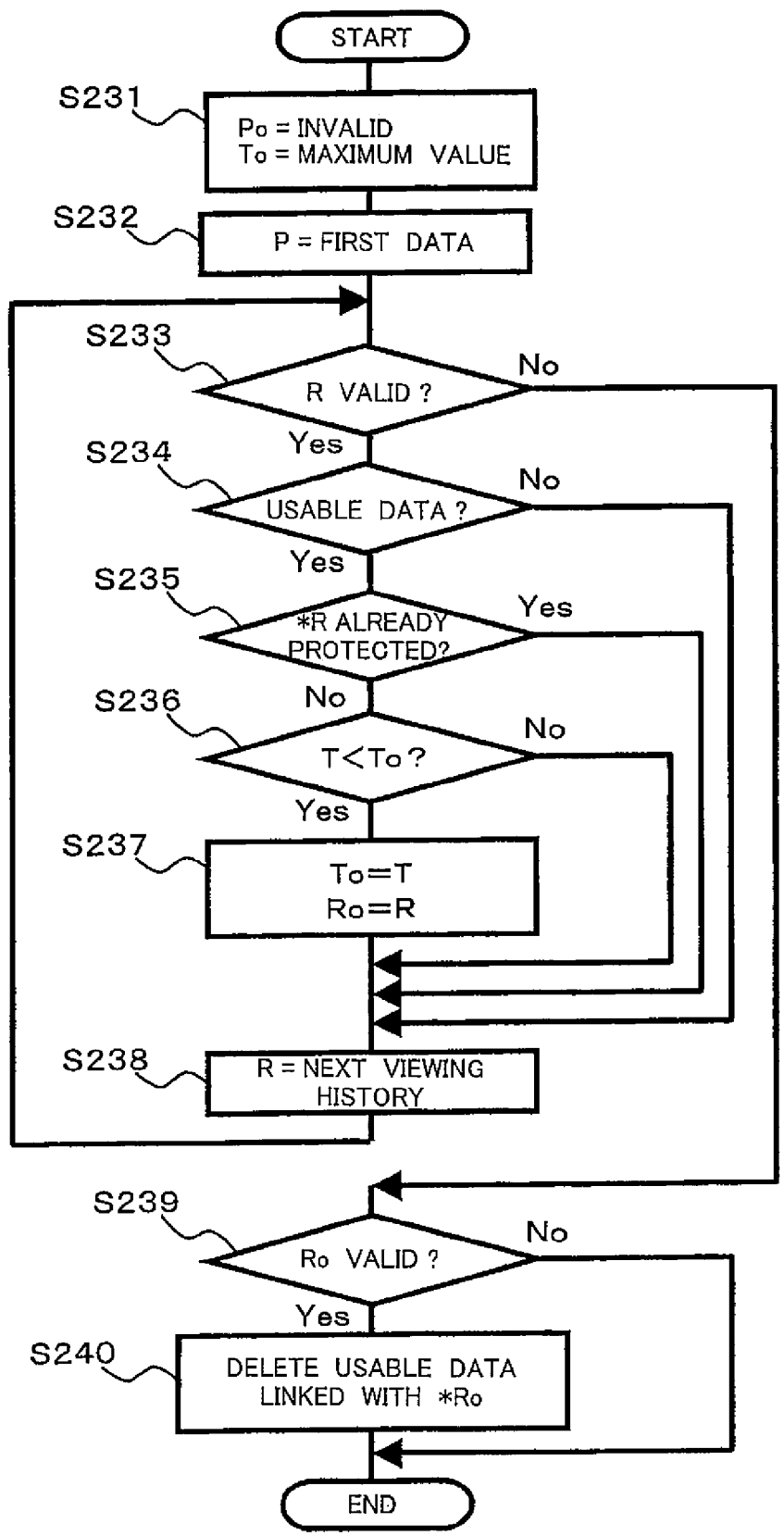
FIG. 12 is a flow chart showing details of a second method of a processing step S20 in FIG. 10.

FIG. 11 is a flow chart showing details of a first method of the processing step S20 in FIG. 10. FIG. 12 is a flow chart showing details of a second method of the processing step S20 in FIG. 10. In the flow chart of FIG. 10, portions common to those of FIG. 6 are shown by same notations and explanations is omitted. Characterizing portions in FIG. 10 are explained.

After the processing step S2 in FIG. 10, the routine proceeds to the judgment processing step S13.

The judgment processing step S13 is processing for the control portion 7 judging whether or not an empty region for storing the detected usable data exists in the storage portion 3A. In the case where the result of this judgment processing step S13 is that an empty region for storing exists in the storage portion 3A, the routine proceeds to the processing step S3. When it does not exist, the routine proceeds to the processing step S20.

The processing step S20 is processing for the control portion 7 forming an empty region of the memory by invalidating or deleting the usable data already stored in the storage portion 3A. Next, the routine proceeds to the processing step S3.

First Method of Processing Step S20

Details of the first method of the processing step S20 will be explained next using FIG. 11. When the processing is started in FIG. 11, the processing step S201 is executed.

The processing step S201 is initialization processing of the variables for selecting the usable data. The control portion 7 sets a pointer variable Po for storing an address of the usable data at NULL and sets up a time variable To at the maximum value which can be represented by that model. Next, the routine proceeds to the processing step S202.

The processing step S202 is processing for the control portion 7 entering a second pointer variable P for storing the address of the usable data for the address of the first usable data. Next, the routine proceeds to the judgment processing step S203.

The judgment processing step S203 is processing for the control portion 7 judging whether or not the pointer variable P is valid, that is, is other than NULL. When the variable P is NULL, this means that the usable data stored in the storage portion 3A are all examined, therefore the routine proceeds to the judgment processing step S208. When the variable P is an address other than NULL, the routine proceeds to the judgment processing step S204.

The judgment processing step S204 is processing for the control portion 7 referring to the protection flag of the usable data that the variable P points to (*P) and judging whether or not the variable P is protected. When the result of the judgment is that this is protected, the routine proceeds to the processing step S207. When this is not protected, the routine proceeds to the judgment processing step S205.

The judgment processing step S205 is processing for the control portion 7 judging whether or not the time T of the usable data that the variable P points to (*P) is less than the variable To. When the result of the judgment is that the time T is less than the variable To, the routine proceeds to the processing step S206. When the time T is not less than the variable To, the routine proceeds to the processing step S207.

The processing step S206 is processing for the control portion 7 entering the time T for the variable To and entering the pointer variable P for the pointer variable Po. By this processing, among the usable data which are not protected, the one oldest in time is stored in Po and To. Next, the routine proceeds to the processing step S207.

The processing step S207 is processing for the control portion 7 entering the address of the usable data next in order to the usable data that the variable P points to (*P) for the variable P. Among the member variables of the usable data, a variable for storing the address of the usable data next in order is prepared, and the address is entered by referring to this. This is a data structure known as a "linear list". If the variable P is the last usable data, NULL is stored in the variable for storing the address of the usable data next in order, therefore the end can be detected in the judgment processing step S203. Next, the routine returns to the judgment processing step S203.

The judgment processing step S208 is processing for the control portion 7 judging whether or not the pointer variable Po is valid, that is, is other than NULL. When the result of the judgment is that the pointer variable Po is other than NULL, the routine proceeds to the processing step S209. When the pointer variable Po is NULL, the processing of this flow chart ends.

The processing step S209 is processing for the control portion 7 deleting the usable data that the variable Po points to (*Po). When the usable data is deleted, in the viewing history data stored linked with that, the link is terminated. If the link is terminated, when the viewing history list is displayed next, the small image concerning the deleted usable data is not displayed in the display portion 5 in the corresponding viewing history. Alternatively, the link may not be terminated, but the viewing history data may be deleted as well.

In this way, in the second embodiment, even in a case where there is no longer any empty region in the storage portion 3A, the usable data which is not protected by the control portion 7 and oldest in age is automatically deleted, so the newly received usable data can be stored. Note that in order to protect the usable data, the protection is set by a not shown other processing operation. At this time, if it is made impossible to set protection for all usable data which can be stored in the storage portion 3A, it becomes possible to store at least one newest usable data without fail.

Processing Step S20 (Second Method)

A flow chart of the second method of the processing step S20 in FIG. 10 is shown in FIG. 12. When the processing is started in FIG. 12, the processing step S231 is executed.

The processing step S231 is initialization processing of the variables for selecting the viewing history data. The control portion 7 sets a pointer variable Ro for storing the address of the viewing history data at NULL and sets a time variable To at the maximum value which can be represented by that model. Next, the routine proceeds to the processing step S232.

The processing step S232 is processing for the control portion 7 entering a second pointer variable R for storing the address of the viewing history data for the address of the first viewing history data. Next, the routine proceeds to the judgment processing step S233.

The judgment processing step S233 is processing for the control portion 7 judging whether or not the pointer variable R is valid, that is, is other than NULL. When the variable R is NULL, this means that viewing history data stored in the viewing history storage portion 4A are all examined, therefore the routine proceeds to the judgment processing step S239. When the variable R is an address other than NULL, the routine proceeds to the judgment processing step S234.

The judgment processing step S234 is processing for the control portion 7 judging whether or not usable data stored linked exists in the viewing history data that the variable R points to (*R). When usable data exists, the routine proceeds to the judgment processing step S235, while when the usable data does not exist, the routine proceeds to the processing step S238.

The judgment processing step S235 is processing for the control portion 7 referring to the protection flag of the viewing history data that the variable R points to (*R) and judging if this is protected. When the result of the judgment is that this is protected, the routine proceeds to the processing step S238. When this is not protected, the routine proceeds to the judgment processing step S236.

The judgment processing step S236 is processing for the control portion 7 judging whether or not the time T of the viewing history data that the variable R points to (*R) is less than the variable To. When the result of the judgment is that the time T is less than the variable To, the routine proceeds to the processing step S237. When the time T is not less than the variable To, the routine proceeds to the processing step S238.

The processing step S237 is processing for the control portion 7 entering the time T for the variable To and entering the pointer variable R for the pointer variable Ro. By this processing, among the viewing history data having linked usable data existing therein and not protected, the one having the oldest timing among the viewing history data which are not protected is stored in Ro and To. Next, the routine proceeds to the processing step S238.

The processing step S238 is processing for the control portion 7 entering the address of the viewing history data next in order to the viewing history data that the variable R points to (*R) for the variable R. Among the member variables of the viewing history data, the variable for storing the address of the viewing history data next in order is prepared, and the address is entered by referring to this. If R is the last viewing history data, NULL is stored in the variable for storing the address of the viewing history data next in order, therefore the end can be detected in the judgment processing step S233. Next, the routine returns to the judgment processing step S233.

The judgment processing step S239 is processing for the control portion 7 judging whether or not the pointer variable Ro is valid, that is, is other than NULL. When the result of the judgment is that the variable Ro is other than NULL, the routine proceeds to the processing step S240. When the variable Ro is NULL, the processing of this flow chart comes to an end.

The processing step S240 is processing for the control portion 7 deleting the usable data linked with the viewing history data that the variable Ro points to (*Ro). When the usable data is deleted, the link is terminated in the viewing history data (*Ro). If the link is terminated, when the viewing history list is displayed next, in the corresponding viewing history, the small image concerning the deleted usable data is not displayed. Alternatively, the link may not be terminated, but the viewing history data (*Ro) may be deleted.

In this way, in the second embodiment, even in a case where there is no longer any empty region in the storage portion 3A, the viewing history data which has linked usable data which is not protected therein and is the oldest is searched for, the linked usable data is automatically deleted, and thus the newly received usable data can be stored. Note that, in order to protect the viewing history data, the protection is set by a not shown other processing operation. At this time, if it is made impossible to set protection for all usable data which can be stored in the viewing history storage portion 4, it becomes possible to store at least one newest viewing history data without fail.

According to the mobile terminal device of the second embodiment of the present invention and the data processing method of that mobile terminal device, the following effects the same as the effects of the first embodiment explained above are exhibited.

(1) The device can be set to a state so that viewing a digital broadcast results in the data usable in the mobile terminal device 100A being stored in the storage portion 3A and selecting this later enables the data to be utilized in the mobile terminal device 100A, so the troublesome procedure of data communications becomes unnecessary.

(2) Good quality data can be stored one after another without having to search for the usable data or choosing a favorite.

(3) A digital broadcast is utilized, therefore there is the advantage that no communication fees are incurred. Further, the usable data is stored during viewing of the program. Therefore, there is the advantage that no time for download is required.

(4) The presence of usable data stored in the storage portion 3A is displayed in the display portion 5 when displaying the viewing history in a list. Therefore, there is the advantage that data related to broadcast programs and the sponsors of broadcast programs can be easily called up and selected.

Further, according to the second embodiment, the following effects are exhibited in addition to the effects explained above.

(5) There is a limit to the storage capacity of the storage portion 3A for the usable data. Therefore, when there is no empty region in the storage portion 3A, it is possible to delete past usable data which is not protected and store new usable data so as to enable the newest usable data to be stored one after another even when the user does not go through any particular procedure.

Third Embodiment

Figure 13:
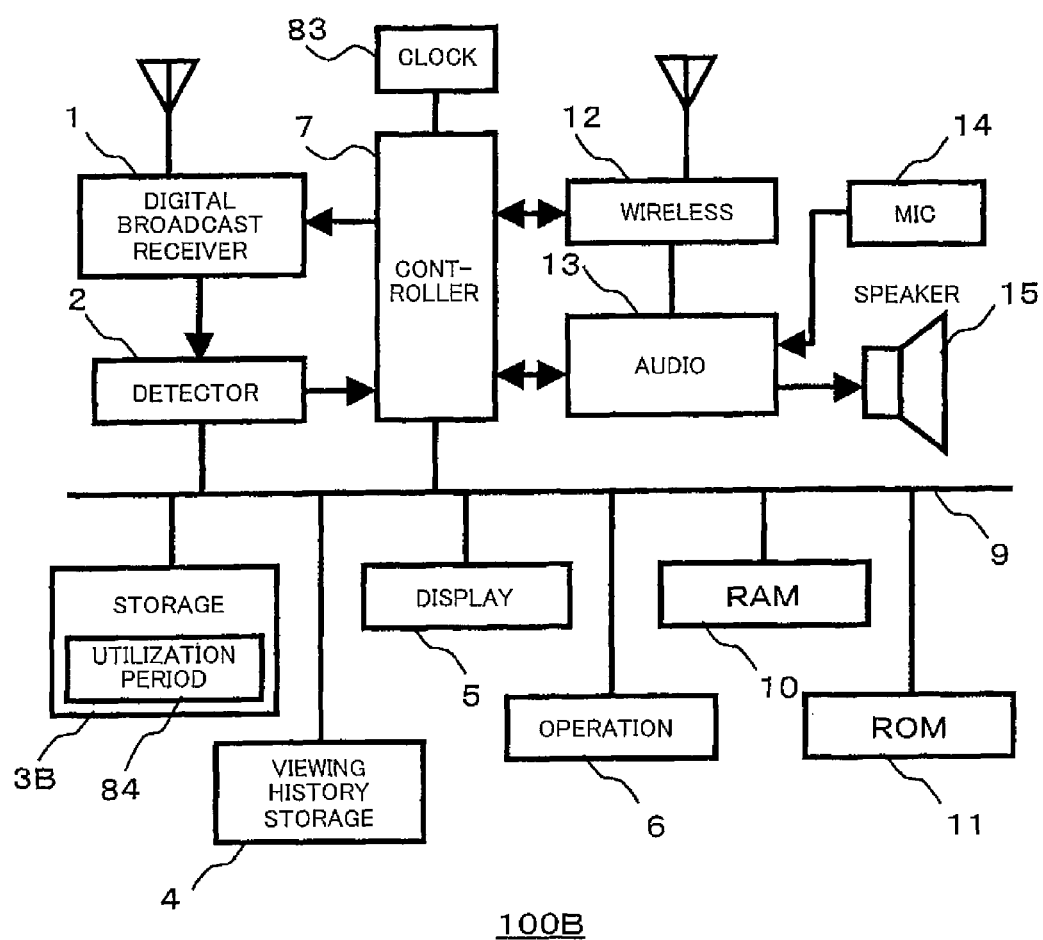
FIG. 13 is a block diagram showing the configuration of a mobile terminal device of a third embodiment of the present invention.

FIG. 13 is a block diagram showing the configuration of a mobile terminal device of a third embodiment of the present invention.

A mobile terminal device 100B of FIG. 13 is, in addition to the mobile terminal device 100 shown in FIG. 1, provided with a clock 83 and a utilization period storage portion 84 in the storage portion 3B. The clock 83 constantly operates by a power supply of a different system from the control portion 7 etc. and holds the real time. The utilization period storage portion 84 is a portion of the storage portion 3B and stores utilization period information attached to each utilization period data.

In the third embodiment, the control portion 7 searches for, among the usable data stored in the storage portion 3B, usable data having utilization period data of a period expired from (over) the present time provided by the clock 83 and thereby disables use or or erases it. That is, it refers to the utilization period information included in the usable data from among the usable data and disables the usable data over the utilization period or erases it based on the present time.

Figure 14:
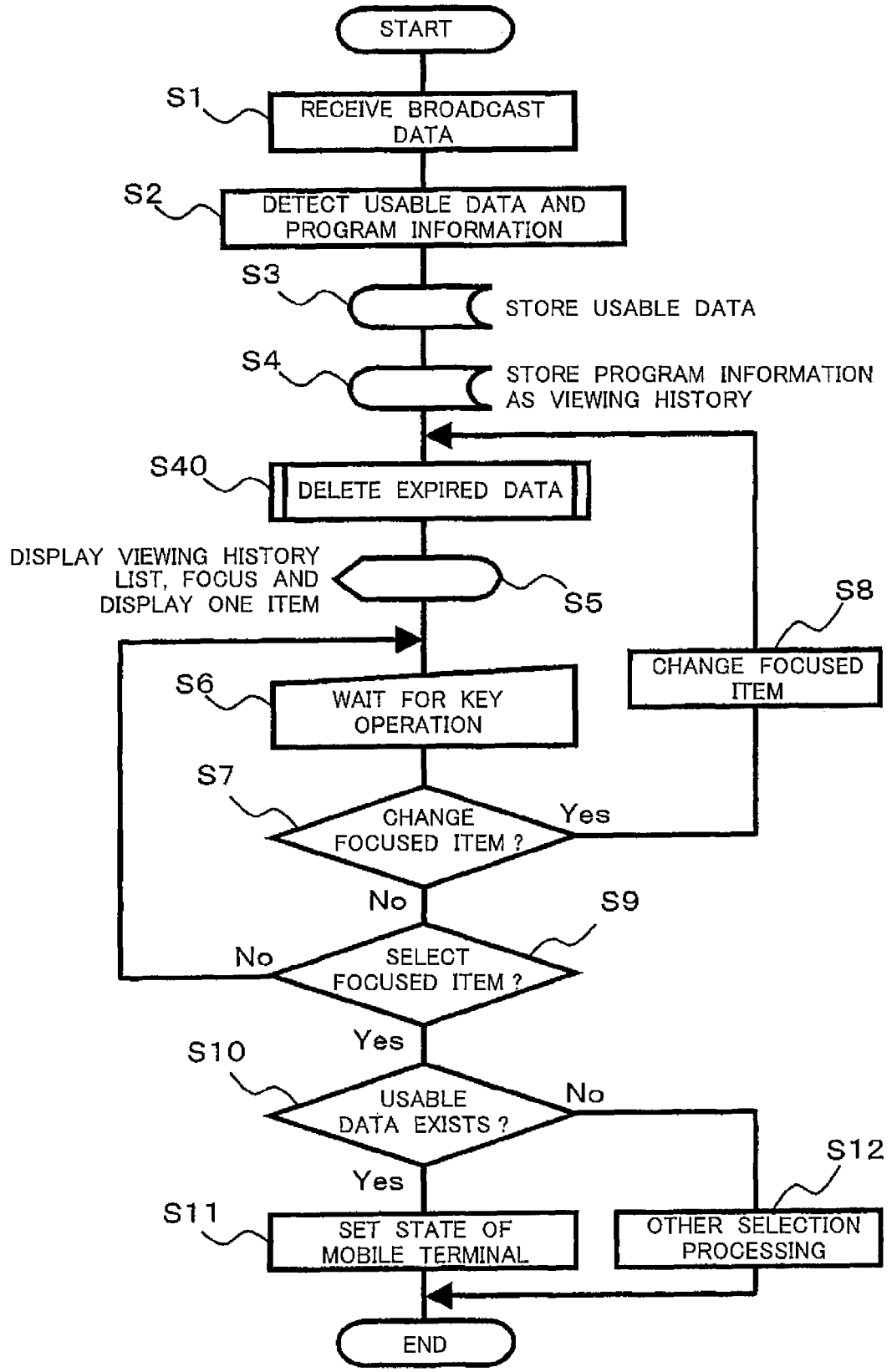
FIG. 14 is a flow chart showing an embodiment of the data utilization method in the mobile terminal device shown in FIG. 13.

FIG. 14 is a flow chart showing an embodiment of the data utilization method in the mobile terminal device 100B shown in FIG. 13.

FIG. 14 is a processing sequence of the mobile terminal device 100B of the third embodiment of the present invention.

Figure 15:
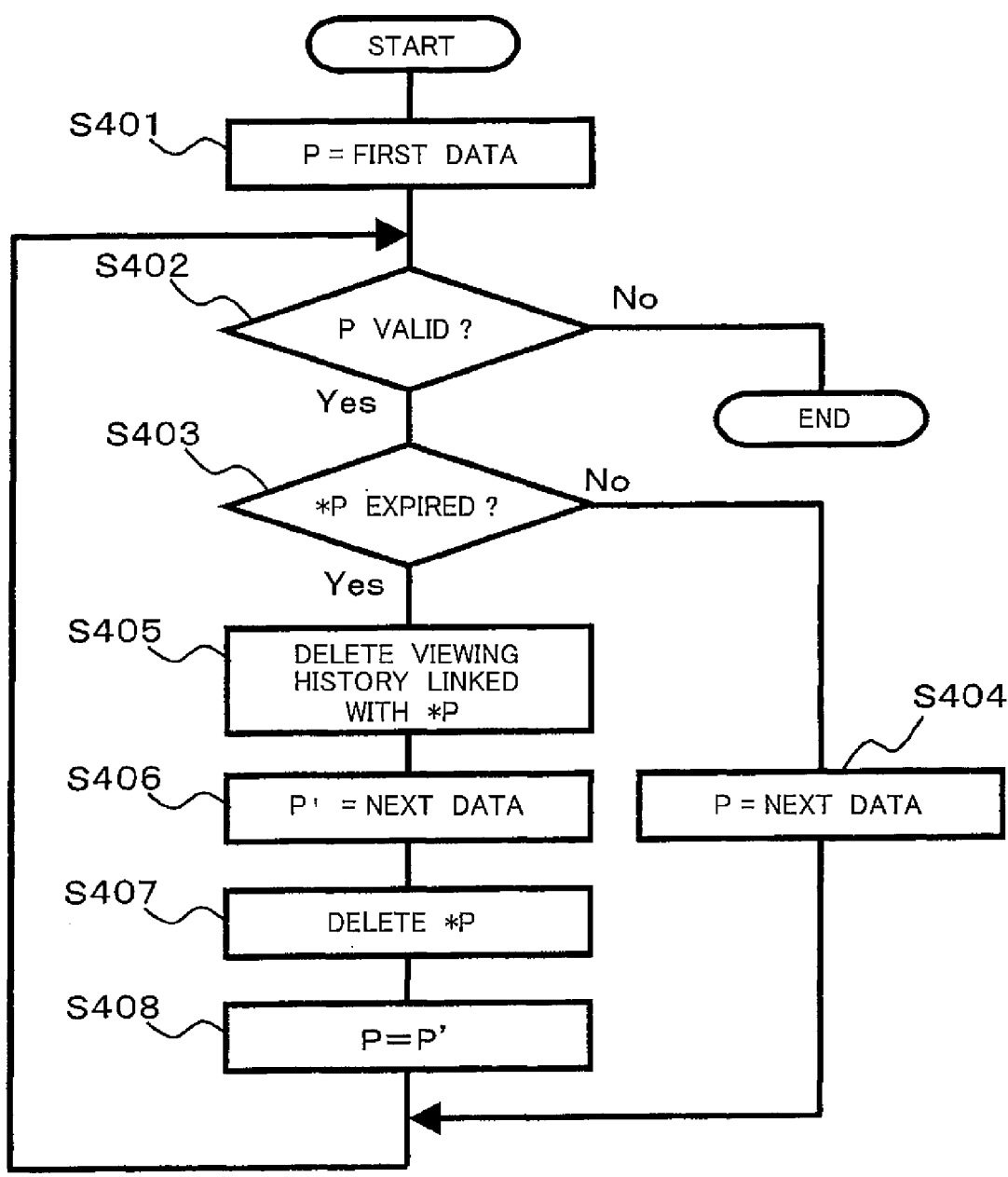
FIG. 15 is a flow chart showing details of a processing step S40 in FIG. 14.

FIG. 15 is a flow chart showing details of the processing step 840 in FIG. 14.

In the flow chart of FIG. 14, portions common to those in FIG. 6 are shown by the same notations and explanations are omitted. The characterizing portions in FIG. 14 will be explained.

In the processing step S4 in FIG. 14, the control portion 7 stores the viewing history data in the viewing history storage portion 4, then the routine proceeds to the processing step S40.

The processing step S40 is processing for the control portion 7 deleting the usable data expired in utilization period. Next, the routine proceeds to the display processing step S5 explained above.

Next, details of the processing step S40 will be explained by using FIG. 15. When the processing is started in FIG. 15, the processing step S401 is executed.

The processing step S401 is the initialization processing for a variable by the control portion 7 and for setting the pointer variable P for storing the address of the usable data to NULL. Next, the routine proceeds to the judgment processing step S402.

The judgment processing step S402 is processing for the control portion 7 judging whether or not the pointer variable P is valid, that is, is other than NULL. When the variable P is NULL, this means that usable data stored in the storage portion 33 are all examined, therefore the processing of this flow chart comes to an end. When the variable P is an address other than NULL, the routine proceeds to the judgment processing step S403.

The judgment processing step S403 is processing for the control portion 7 referring to the utilization period data of the usable data that the variable P points to (*P) and judging whether or not the period is expired in comparison with the present time. That is, the control portion 7 judges that the utilization period is expired when the value of the utilization period is smaller than the present time. When the period is not expired, the routine proceeds to the processing step S404, while when the period is expired, the routine proceeds to the processing step S405.

The processing step S404 is processing for the control portion 7 entering the address of the usable data next in order to the usable data that the variable P points to (*P) for the variable P. Next, the routine returns to the judgment processing step S402.

The processing step S405 is processing for the control portion 7 terminating the link in the viewing history data stored in the viewing history storage portion 4 linked with the usable data that the pointer variable P points to (*P). Next, the routine proceeds to the processing step S406.

The processing step S406 is processing for the control portion 7 entering the address of the usable data next in order to the usable data that the variable P points to (*P) for the pointer variable P'. Next, the routine proceeds to the processing step S407.

The processing step S407 is processing for the control portion 7 deleting the usable data that the variable P points to (*P). Next, the routine proceeds to the processing step S408.

The processing step S408 is processing for the control portion 7 entering the pointer variable P' for the pointer variable P. Next, the routine returns to the judgment processing step S402.

At a point of time when the examination of all usable data stored in the storage portion 3B ends, the pointer variable P becomes NULL, therefore the end is detected in the judgment processing step S402, and the processing of this flow chart ends.

In this way, in the third embodiment of the present invention, it is examined if there is expired usable data every time before the preparation and display of the viewing history list in processing step S5, the expired usable data is deleted from the storage portion 3B, then the viewing history list is prepared and displayed in the display portion 5. For this reason, the provider of the usable data becomes able to protect the rights with respect to data and reliably store new usable data by distributing the usable data with set utilization periods by a broadcast.

In this way, according to the third embodiment, other than the above effects, the effects of first and second embodiments explained above can be exhibited.

Fourth Embodiment

Figure 16:
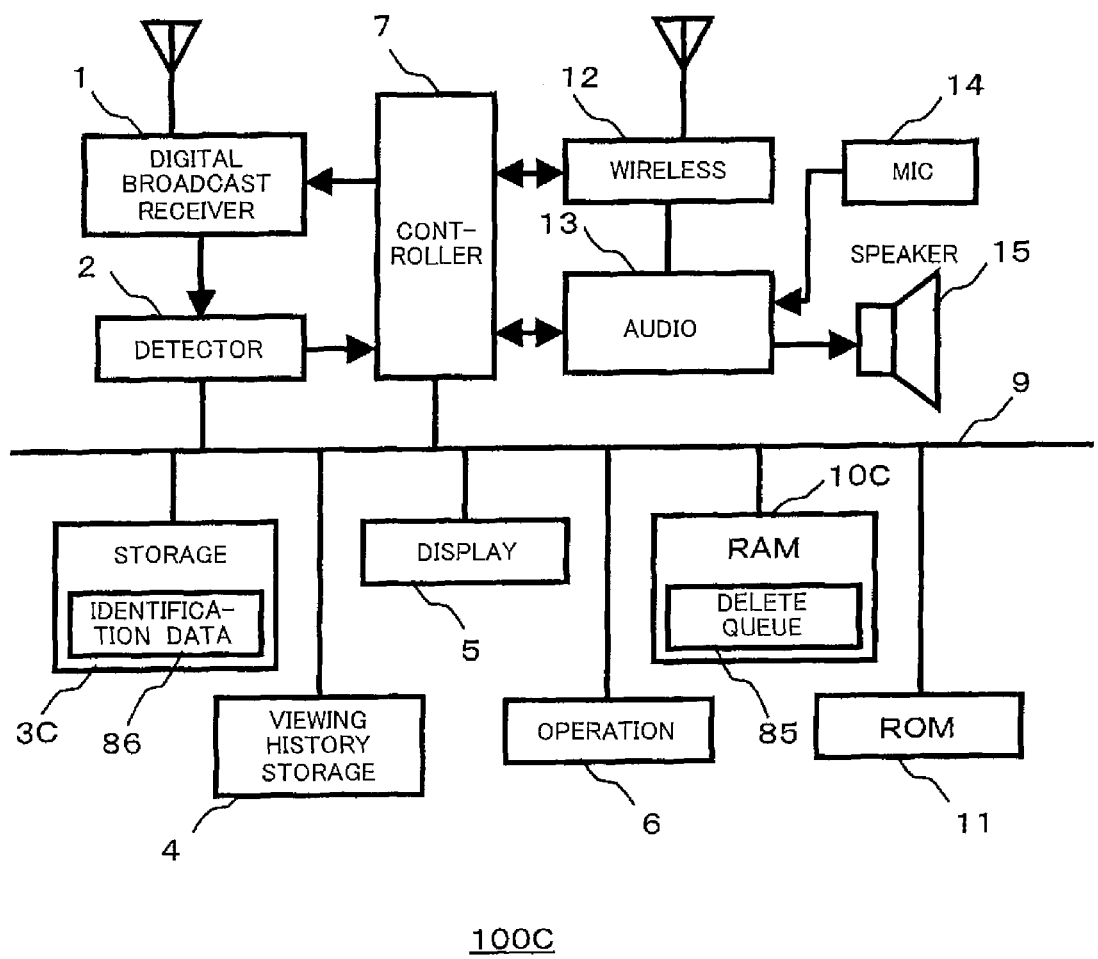
FIG. 16 is a block diagram showing the configuration of a mobile terminal device of a fourth embodiment of the present invention.

FIG. 16 is a block diagram showing the configuration of a mobile terminal device of a fourth embodiment of the present invention.

In a mobile terminal device 100C of the fourth embodiment shown in FIG. 16, in addition to the mobile terminal device 100 shown in FIG. 1, a delete command queue 85 is provided in the RAM 10C, and an identification data storage portion 86 is provided in the storage portion 3C.

The usable data is broadcast after having the identification data attached to it. When this is stored in the storage portion 3C, the identification data is stored in the identification data storage portion 86.

After the broadcast of the usable data, when the party which supplied the usable data desires to delete this after a while, it broadcasts a command instructing the deletion. The deletion is instructed by designating the identification data and broadcasting it by using the same multiplexing method as that of the usable data. The detection portion 2 detects the delete command, then once stores this in the delete command queue 85 of the RAM 10C.

The controlling means 7 checks the delete command queue 85. If a delete command is stored, it searches the usable data having the same identification data among the usable data stored in the storage portion 3C and erases any that exists.

That is, when detecting a command instructing specific usable data from among the received broadcast data, the instructed usable data among the usable data stored in the storing means is disabled or erased.

Figure 17:
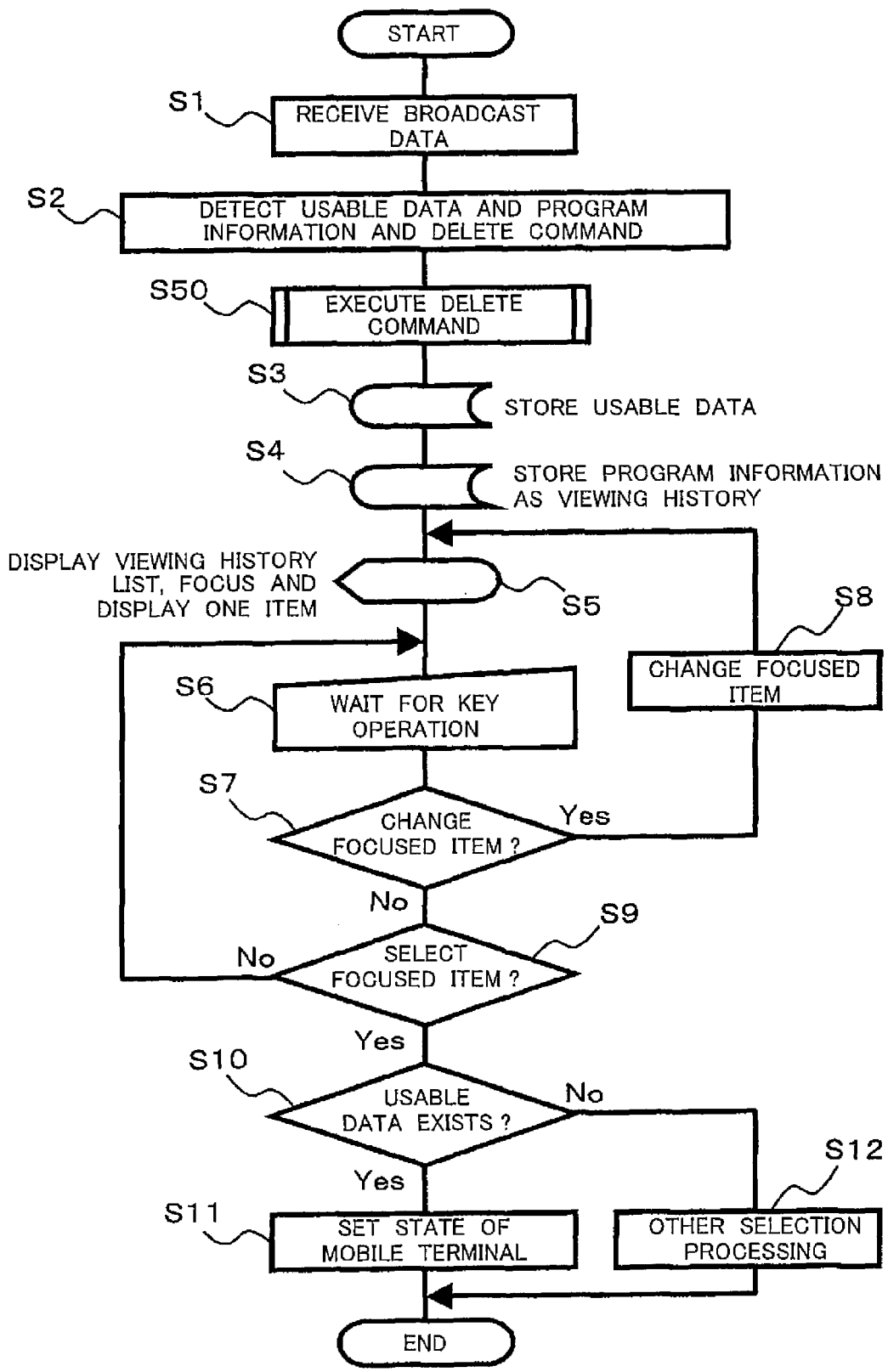
FIG. 17 is a flow chart showing an embodiment of the data utilization method of the mobile terminal device of the fourth embodiment of the present invention.

FIG. 17 is a flow chart showing an embodiment of the data utilization method of the mobile terminal device 100C of the fourth embodiment of the present invention. FIG. 17 is a processing sequence of the mobile terminal device 100C shown in FIG. 16.

Figure 18:
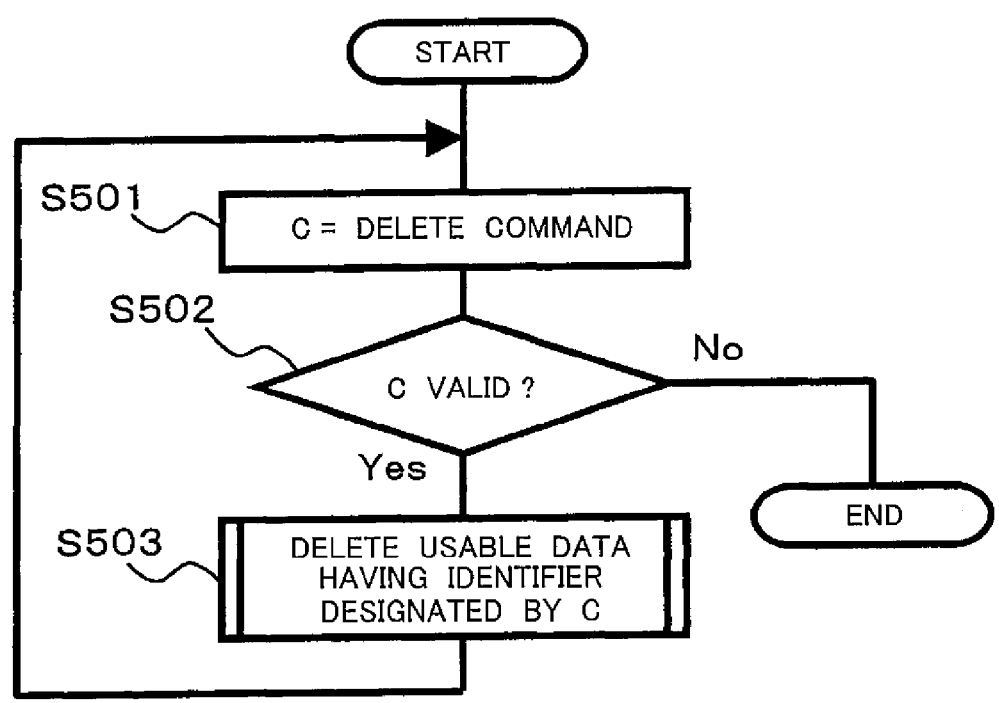
FIG. 18 is a flow chart showing details of a processing step S50 in FIG. 17.

FIG. 18 is a flow chart showing details of the processing step S50 in FIG. 17.

Figure 19:
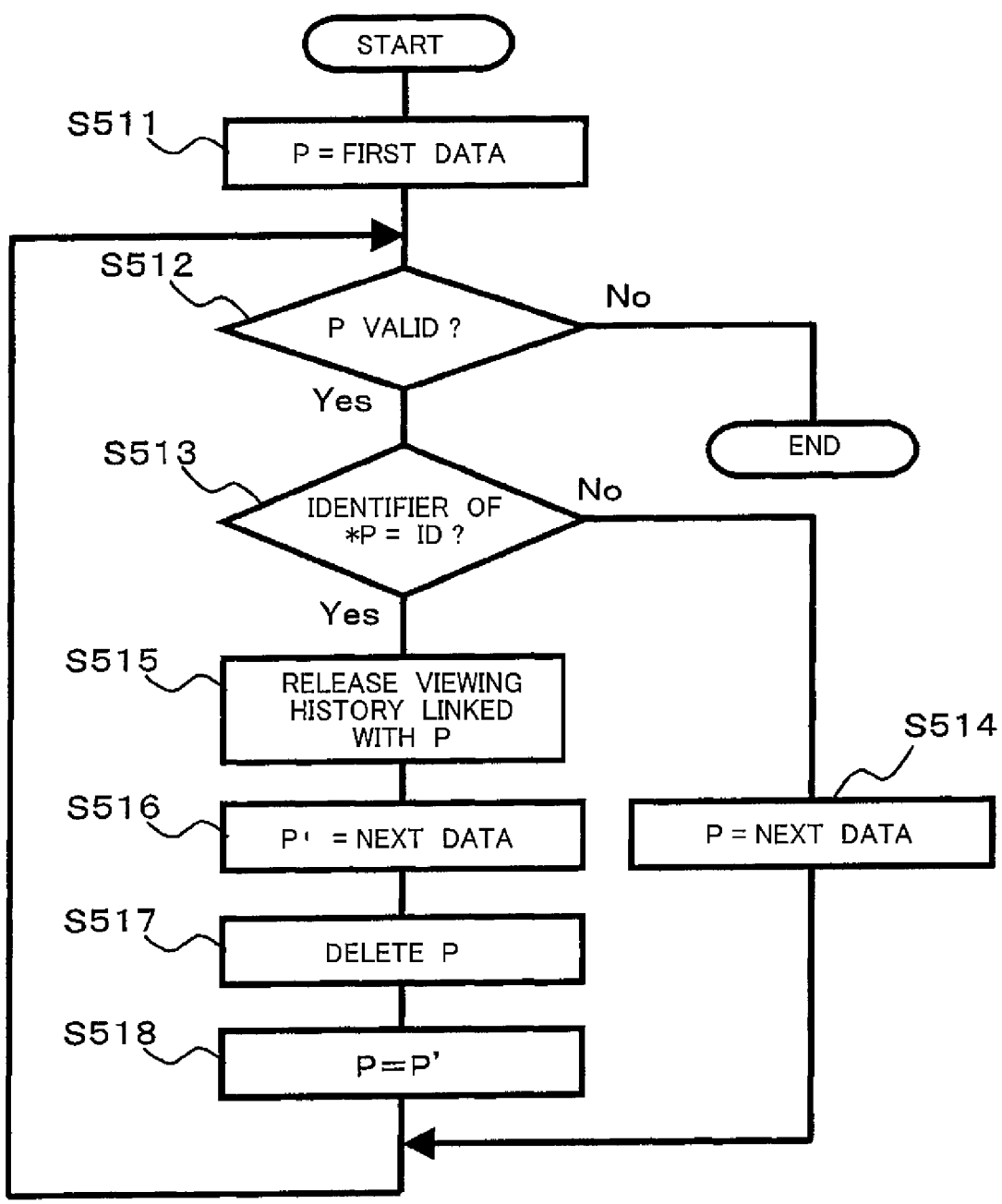
FIG. 19 is a flow chart showing details of a processing step S503 in FIG. 18.

FIG. 19 is a flow chart showing details of the processing step S503 in FIG. 18.

In the flow chart of FIG. 17, portions common to those in FIG. 6 showing the processing in the mobile terminal device 100 of the first embodiment are shown by the same notations and explanations are omitted. Characterizing portions in FIG. 17 will be explained.

The processing step S2 is processing for detecting the data usable in the mobile terminal device 100C, program information of programs, and further any delete command from among the received broadcast data by the detection portion 2. The delete command as well is assigned identification data assigned to the data in which it is stored. The detection portion 2 detects this according to the identification data. The detected delete command is once stored in the delete command queue 85 provided in the RAM 10C by the control portion 7. Next, the routine proceeds to the processing step S50.

The processing step S50 is processing for the control portion 7 executing the delete command stored in the delete command queue 85. Next, the routine proceeds to the processing step S3.

Next, details of the processing step S50 will be explained with reference to FIG. 18. When the processing is started in FIG. 18, the processing step S501 is executed.

The processing step S501 is processing for the control portion 7 extracting a delete command from the delete command queue 85 and entering this for a variable C. If there is no delete command in the delete command queue 85, an error command is entered for C. Next, the routine proceeds to the judgment processing step S502.

The judgment processing step S502 is processing for the control portion 7 judging whether or not the variable C is a valid delete command. When this is a valid delete command, the routine proceeds to the processing step S503, while when this is an invalid command, including an error command, the processing of this flow chart is ended.

The processing step S503 is processing for the control portion 7 defining the identification data designated by the delete command C as I and examining usable data having the same identification data as I and, if this exists, deleting it. Next, the routine returns to processing step S501.

The processing of flow chart shown in FIG. 18 is executed until there are no longer any delete commands in the delete command queue 85. An error command is entered for C, and the routine is ended after that.

Next, details of the processing step S503 will be explained with reference to FIG. 19. In FIG. 19, it is assumed that the identification data to be deleted is stored in the identification data variable I before the processing is started. When the processing is started, the processing step S511 is executed.

The processing step S511 is the initialization processing of variables by the control portion 7 and for setting the pointer variable P for storing the address of the usable data to NULL. Next, the routine proceeds to the judgment processing step S512.

The judgment processing step S512 is processing for the control portion 7 judging whether or not the pointer variable P is valid, that is, is other than NULL. When the variable P is NULL, this means that all of the usable data stored in the storage portion 3 are examined, therefore the processing of this flow chart comes to an end. When the variable P is an address other than NULL, the routine proceeds to the judgment processing step S513.

The judgment processing step S513 is processing for the control portion 7 referring to the identification data of the usable data that the variable P points to (*P) and judging whether or not this coincides with the variable I. When they do not coincide, the routine proceeds to the processing step S14, while when they coincide, the routine proceeds to the processing step S515.

The processing step S514 is processing for the control portion 7 entering the address of the usable data next in order to the usable data that the variable P points to (*P) for the variable P. Next, the routine returns to the judgment processing step S512.

The processing step S515 is processing for the control portion 7 terminating a link in the viewing history data stored in the viewing history storage portion 4 linked with the usable data that the variable P points to (*P). Next, the routine proceeds to the processing step S516.

The processing step S516 is processing for the control portion 7 entering the address of the usable data next in order to the usable data that the variable P points to (*P) for the pointer variable P'. Next, the routine proceeds to the processing step S517.

The processing step S517 is processing for the control portion 7 deleting the usable data that the variable P points to (*P). Next, the routine proceeds to the processing step S518.

The processing step S518 is processing for the control portion 7 entering the pointer variable P' into the pointer variable P. Next, the routine returns to the judgment processing step S512.

At a point of time when the examination of all usable data stored in the storage portion 3C ends, the pointer variable P becomes NULL, therefore the end is detected in the judgment processing step S512, and the processing of this flow chart ends.

Fifth Embodiment

Figure 20:
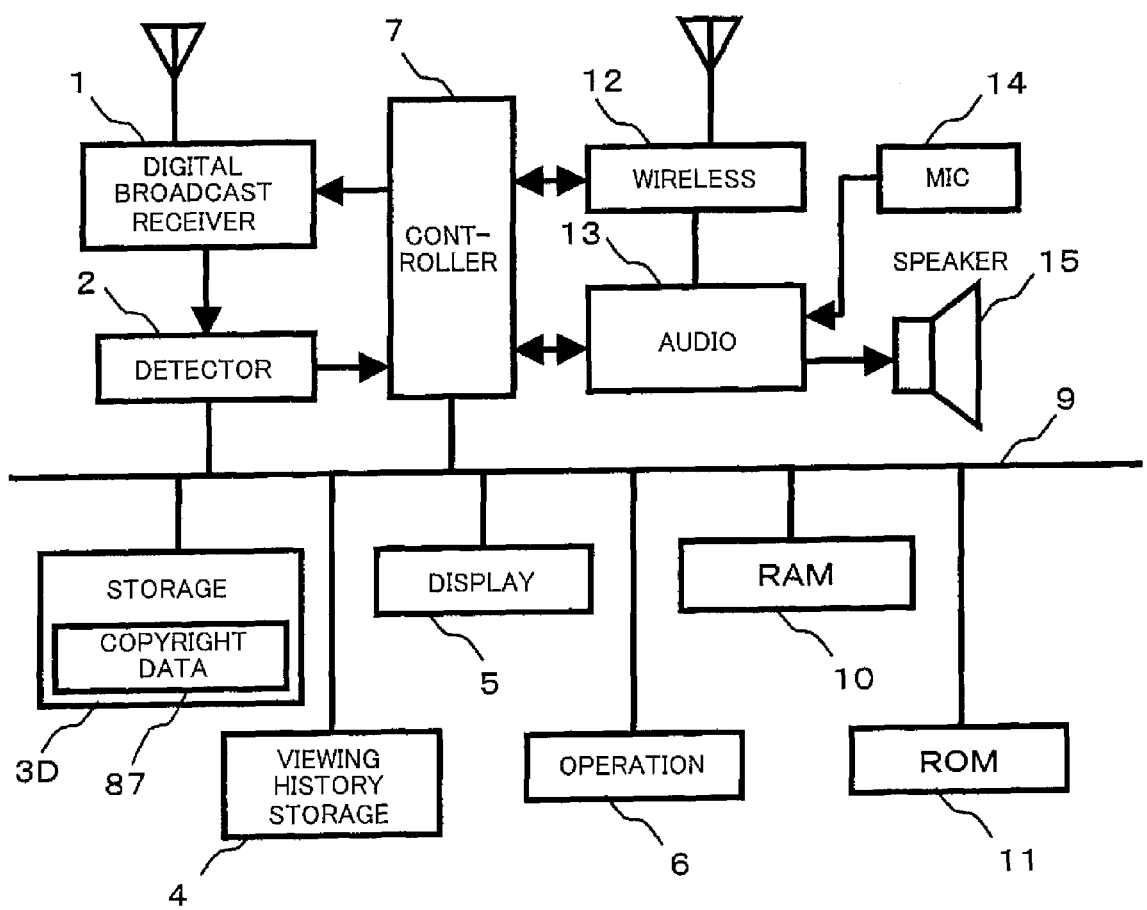
FIG. 20 is a block diagram showing the configuration of a mobile terminal device of a fifth embodiment of the present invention.

FIG. 20 is a block diagram showing the configuration of a mobile terminal device of a fifth embodiment of the present invention.

A mobile terminal device 100D shown in FIG. 20 is, in addition to the mobile terminal device 100 shown in FIG. 1, provided with a copyright protection data storage portion 87 in the storage portion 3D.

The usable data is broadcast attaching the copyright protection data to this. When this is stored in the storage portion 3D, the copyright protection data is stored in the copyright protection data storage portion 87.

The copyright protection data includes copyright holder data, copy permission flags, utilization permission flags, etc.

When it is focused and selected that the mobile terminal device 100D utilize (use) the received usable data, the control portion 7 performs processing for display or processing for reproduction of, for example, wallpaper screen, ring signal, or other usable data set in a variety of scenes. The functions of the mobile terminal device 100D include the function of processing an image to prepare a new image and a function of processing a moving picture image (movie) or audio data to convert this to other data. Further, in order to transmit this attached to an e-mail, a copy of the data encoded by for example the BASE64 scheme is prepared. When such utilization is carried out, in the fifth embodiment, provision is made of the control portion 7 for referring to the copyright protection data and preparing a copy only in a case where a copying permission flag in this permits the preparation of the copy.

Further, in the fifth embodiment, it is possible to permit the display of an image and the reproduction (use) of a moving picture image or audio data only in a case where a certain condition is satisfied by using the utilization permission flag in the copyright protection data of the fifth embodiment. That condition includes for example a case where the user pays a content utilization fee, a case where the user plays a game which is broadcast multiplexed on the broadcast data and acquires a predetermined score, and a case where the user collects points distributed by the data broadcasting when viewing a predetermined commercial and a sum of those points reaches a predetermined value. In order to enable such control, in the fifth embodiment, there is provided the control portion 7 for referring to the copyright protection data of the copyright protection data storage portion 87 when utilizing the usable data stored in the storage portion 3D and utilizing the data only in a case where the utilization permission flag of this permits the utilization of the usable data. Then, the utilization permission flag is set to utilization prohibited (use prohibited) at the time of the broadcast of the usable data. The control portion 7 stores the usable data in the rewritable storage portion 87 so that this is rewritten to utilization permission when a certain condition is satisfied later.

The copyright protection data in the embodiment of the present invention may be handled depending upon the time as well. In this case, an embodiment where copying or utilization (use) is permitted for a certain period, the copying and utilization are once prohibited when a certain period expires, then when a predetermined condition such as the user paying a utilization fee is satisfied after that, the copying and utilization (use) are permitted again is also included in the fifth embodiment of the present invention.

Further, regarding the handling of the utilization permission flag of the fifth embodiment, it is also possible to prohibit partial utilization. In this case, an embodiment displaying part of an image or video and hiding part of the display or playing back music data for only part of the time and prohibiting playback of the other part when the utilization permission flag does not permit the utilization (use) is also included in the embodiment of the present invention.

Figure 21:
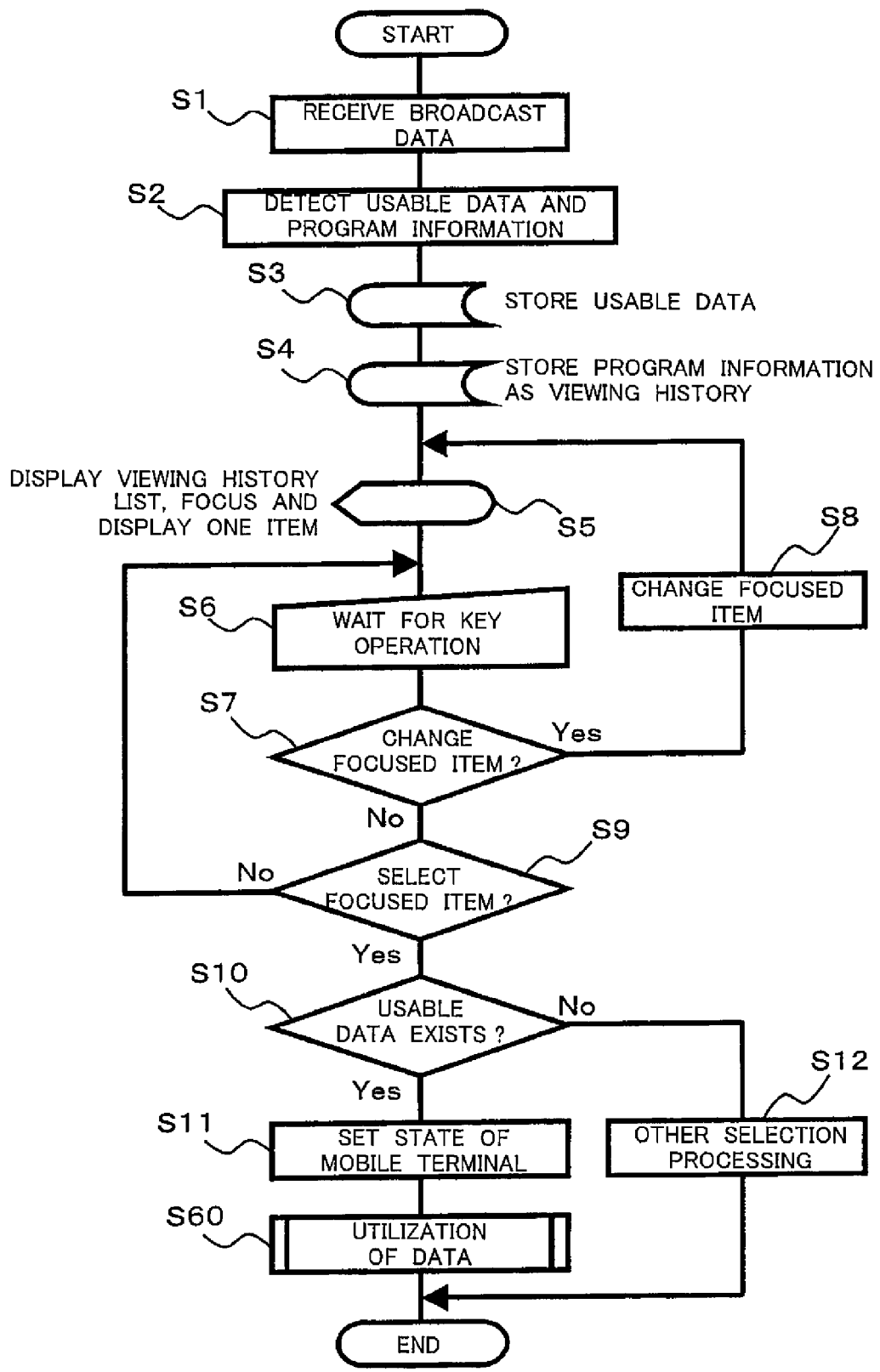
FIG. 21 is a flow chart showing an embodiment of the data utilization method of the mobile terminal device of the fifth embodiment of the present invention.

FIG. 21 is a flow chart showing an embodiment of the data utilization method of the mobile terminal device of the fifth embodiment of the present invention. FIG. 21 shows a processing sequence of the mobile terminal device 100D of the fifth embodiment of the present invention shown in FIG. 20.

FIG. 21 is common to the processing of the flow chart of FIG. 6 showing the processing of the first embodiment. The difference resides in the content of the processing step S60.

Figure 22:
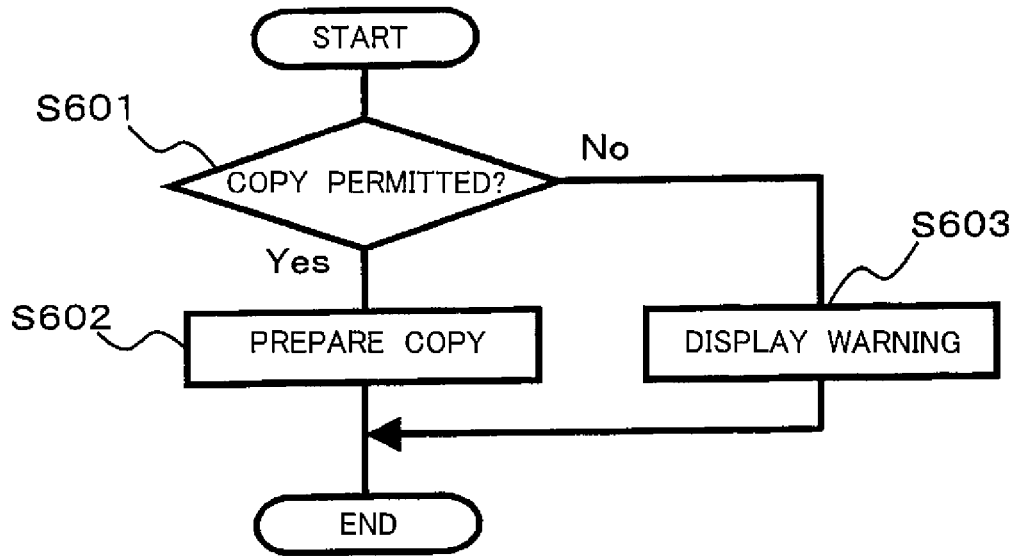
FIG. 22 is a flow chart showing details of a first method of a processing step S60 in FIG. 21.
Figure 23:
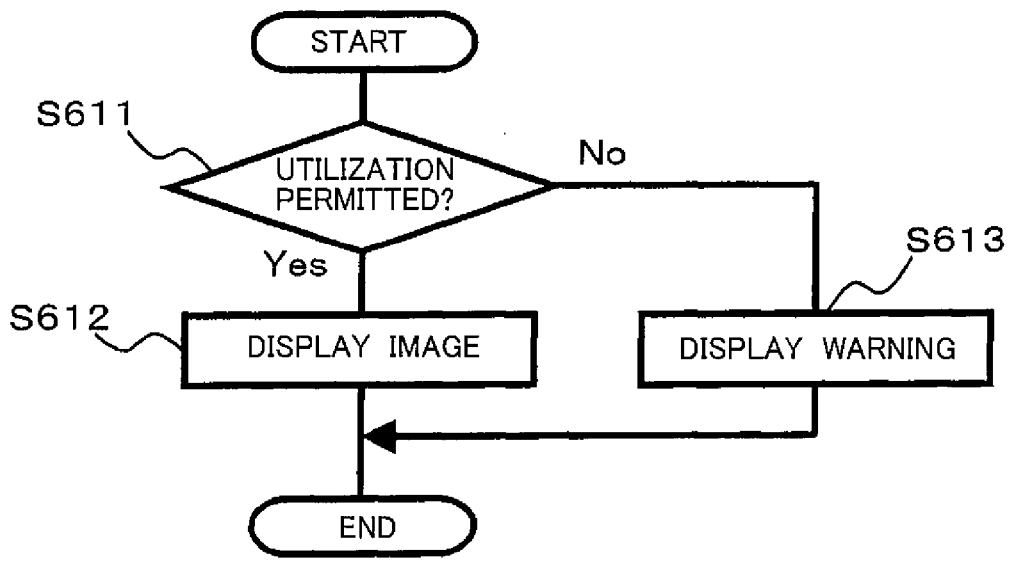
FIG. 23 is a flow chart showing details of a second method of a processing step S60 in FIG. 21.

FIG. 22 is a flow chart showing details of a first method of the processing step S60 in FIG. 21. FIG. 23 is a flow chart showing details of a second method of the processing step S60 in FIG. 21. In the flow chart of FIG. 21, portions common to those of FIG. 6 are shown by the same notations and explanations are omitted. The characterizing portions in FIG. 21 will be explained.

When the control portion 7 sets the mobile terminal device 100D to a state so as to utilize the usable data in the processing step S11, the routine proceeds to the processing step S60 next.

The processing step S60 is processing for the control portion 7 utilizing the usable data actually setting the state of the mobile terminal device. After this, the processing of this flow chart ends.

First Method

Details of the processing step S60 will be explained with reference to FIG. 22. When the processing is started in FIG. 22, the judgment processing step S601 is executed.

The judgment processing step S601 is for the control portion 7 to judge whether or not the copying permission flag in the copyright protection data permits the preparation of a copy. When copying is permitted as a result of this judgment processing step S601, the routine proceeds to the processing step S602. In the case of prohibition, the routine proceeds to the processing step S603.

The processing step S602 is processing for the control portion 7 preparing the copy. After this, the processing of this flow chart ends.

The processing step S603 is processing for the control portion 7 displaying an image in the display portion 5 warning that the preparation of a copy of usable data is not permitted to the user and generating an alarm sound from the speaker 15. After this, the processing of this flow chart ends.

Second Method

Details of the processing step S60 will be explained with reference to FIG. 23. When starting the processing in FIG. 23, the judgment processing step S611 is executed.

The judgment processing step S611 is for the control portion 7 judging whether or not the utilization permission flag in the copyright protection data permits the preparation of a copy. Where copying is allowed as a result of this judgment processing step S611, the routine proceeds to the processing step S612. In the case of prohibition, the routine proceeds to the processing step S613.

The processing step S612 is processing for the control portion 7 displaying the usable data in the display portion 5 or reproducing this by the speaker 15. After this, the processing of this flow chart ends.

The processing step S613 is processing for the control portion 7 displaying in the display portion an image warning that the preparation of a copy of the usable data is not permitted to the user and generating an alarm sound from the speaker 15. After this, the processing of this flow chart ends.

As explained above, according to embodiments of the present invention, the following effects are exhibited.

(1) The device can be set to a state so that viewing a digital broadcast results in the data usable in the mobile terminal device being stored and selecting this later enables the data to be utilized in the mobile terminal device, so the troublesome procedure of data communications becomes unnecessary.

(2) Good quality data can be stored one after another without having to search for the usable data or choosing a favorite.

(3) A digital broadcast is utilized, therefore there is the advantage that no communication fees are incurred. Further, the usable data is stored during viewing of the program. Therefore, there is the advantage that no time for download is required.

(4) The presence of stored usable data is displayed when displaying the viewing history in a list. Therefore, there is the advantage that data related to programs and the sponsors of programs can be easily called up and selected.

(5) There is a limit to the storage capacity for the usable data. Therefore, when there is no empty region, it is possible to delete past usable data which is not protected and store new usable data so as to enable the newest usable data to be stored one after another even when the user does not go through any particular procedure.

(6) The provider of the data can set the utilization period and use a command which was multiplexed on a digital broadcast and was broadcast to delete the stored usable data, so there are the advantages that it is possible to protect the rights of the data provider or to reutilize the memory at the instruction of the data provider side so as to enable distribution of the newest usable data at all times.

Further, the present invention is not limited to the embodiments explained above and can be applied to a variety of applications. For example, the history explained above is not limited to the viewing history and can be applied to a recording history etc. as well. Further, the device is not limited to a mobile terminal device so far as it is a device which can utilize image, music data, and other usable data (broadcast content) explained above. It may also be a broadcast receiving apparatus.

The invention claimed is:

1. A broadcast receiving apparatus comprising:
a digital broadcast receiving unit configured to receive a broadcast program,
a storing unit configured to store usable data that includes at least one of a still image, ring signal and music that is usable in the broadcast receiving apparatus, and
a displaying unit configured to display history data linking the usable data stored in the storing unit and broadcast program information corresponding to the usable data as a history list, wherein the usable data is neither the broadcast program nor the broadcast program information, and the usable data is included in broadcast data that is multiplexed on the broadcast program.

2. A broadcast receiving apparatus as set forth in claim 1, wherein said broadcast receiving apparatus further comprises a controlling unit configured to execute processing using said usable data when selecting usable data of a broadcast program displayed on said history list.

3. A broadcast receiving apparatus as set forth in claim 1, wherein:

said storing unit stores protection flags linked with said usable data, and said broadcast receiving apparatus further comprises a controlling unit configured to refer to protection flags of said usable data stored in said storing unit when there is no empty region for storing said new usable data in said storing unit, and then storing new usable data in a storage region of nonprotected usable data.

4. A broadcast receiving apparatus as set forth in claim 1, wherein:

said storing unit stores protection flags linked with said history data, and said broadcast receiving apparatus further comprises a controlling unit configured to refer to protection flags of said history data stored in said storing unit when there is no empty region for storing said new usable data in said storing unit, and then storing new usable data in a storage region of usable data corresponding to nonprotected history data.

5. A broadcast receiving apparatus as set forth in claim 1, wherein said broadcast receiving apparatus further comprises a controlling unit configured to refer to utilization period information included in said usable data from said usable data stored in said storing unit and disables or erases usable data whose utilization period has passed based on a current time.

6. A broadcast receiving apparatus as set forth in claim 1, wherein said broadcast receiving apparatus disables or erases any instructed usable data in said usable data stored in said storing unit when detecting a command instructing deletion of specific usable data from received broadcast data.

7. A broadcast receiving apparatus as set forth in claim 1, wherein said broadcast receiving apparatus further comprises a controlling unit configured to refer to copyright protection data included in said usable data when preparing a copy based on said usable data stored in said storing unit and permitting or prohibiting copying based on said copyright protection data.

8. A broadcast receiving apparatus as set forth in claim 1, wherein said broadcast receiving apparatus further comprises a controlling unit configured to refer to copyright protection data included in said usable data when using said usable data stored in said storing unit and permitting or prohibiting use based on said copyright protection data.

9. A data processing method characterized by receiving a broadcast program, storing usable data that includes at least one of a still image, ring signal and music that is usable in a broadcast receiving apparatus, and displaying history data linking the stored usable data and broadcast program information corresponding to the usable data as a history list, wherein the usable data is neither the broadcast program nor the broadcast program information, and the usable data is included in broadcast data that is multiplexed on the broadcast program.

* * * * *